US011595785B2

(12) United States Patent
Files et al.

(10) Patent No.: US 11,595,785 B2
(45) Date of Patent: *Feb. 28, 2023

(54) METHOD AND APPARATUS FOR WIRELESS SIGNAL BASED LOCATION ENDPOINT TRIANGULATION USING 5G MMWAVE, LTE, AND WI-FI

(71) Applicant: Dell Products, LP, Round Rock, TX (US)

(72) Inventors: Jace W. Files, Round Rock, TX (US); Liam B. Quinn, Austin, TX (US); Abu S. Sanaullah, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 136 days.

This patent is subject to a terminal disclaimer.

(21) Appl. No.: 17/107,577

(22) Filed: Nov. 30, 2020

(65) Prior Publication Data

US 2021/0243563 A1 Aug. 5, 2021

Related U.S. Application Data

(63) Continuation of application No. 16/779,420, filed on Jan. 31, 2020, now Pat. No. 10,856,110.

(51) Int. Cl.
*H04W 4/029* (2018.01)
*G01S 5/02* (2010.01)
(Continued)

(52) U.S. Cl.
CPC ........... *H04W 4/029* (2018.02); *G01S 5/0268* (2013.01); *G01S 5/04* (2013.01); *G01S 5/14* (2013.01);
(Continued)

(58) Field of Classification Search
CPC ..... H04W 4/029; H04W 8/245; H04W 88/02; G01S 5/0268; G01S 5/04; G01S 5/14; H04M 1/724; H04M 1/72403
See application file for complete search history.

(56) References Cited

U.S. PATENT DOCUMENTS 9,642,167 B1 5/2017 Snyder
2011/0081898 A1 4/2011 Park
(Continued)

FOREIGN PATENT DOCUMENTS

KR 20120033405 A * 4/2012

*Primary Examiner* — Umair Ahsan
(74) *Attorney, Agent, or Firm* — Prol Intellectual Property Law, PLLC; H. Kenneth Prol

(57) ABSTRACT

An information handling system operating a diverse wireless location determination system, comprising receiving an instruction to determine a location of an endpoint information handling system having a plurality of network interface device modules supporting a plurality of wireless network protocols, a processor executing instructions to aggregate data including detected time of flight (TOF) signal distance and signal quality values relating to signals exchanged between the endpoint information handling system and a plurality of diverse wireless protocol access points, the processor to determine at least three diverse wireless protocol access point signals meet a signal quality threshold, where at least two of the diverse wireless protocol access points operate under different wireless protocols, and the processor conducting weighted multiangulation or multilateration utilizing the detected TOF signal distances of the exchanged signals based on the detected signal quality category and type of wireless protocol for the exchanged signal.

20 Claims, 8 Drawing Sheets

(51) Int. Cl.
  *G01S 5/04* (2006.01)
  *G01S 5/14* (2006.01)
  *H04W 8/24* (2009.01)
  *H04W 88/02* (2009.01)
  *H04M 1/724* (2021.01)
  *H04M 1/72403* (2021.01)

(52) U.S. Cl.
  CPC ........ *H04M 1/724* (2021.01); *H04M 1/72403* (2021.01); *H04W 8/245* (2013.01); *H04W 88/02* (2013.01)

(56) References Cited

U.S. PATENT DOCUMENTS

| | | |
|---|---|---|
| 2013/0143584 A1 | 6/2013 | Machaley |
| 2016/0103201 A1 | 4/2016 | Lee |
| 2016/0116598 A1 | 4/2016 | Wu |
| 2018/0255269 A1 | 9/2018 | Klein |
| 2019/0033420 A1 | 1/2019 | Knaappila |
| 2019/0132259 A1 | 5/2019 | Kim |
| 2019/0230475 A1* | 7/2019 | Edge .................... H04W 64/00 |
| 2019/0306825 A1 | 10/2019 | Lindskog |
| 2020/0134668 A1 | 4/2020 | Hsieh |
| 2020/0152002 A1 | 5/2020 | Burman |
| 2020/0178228 A1 | 6/2020 | Li |

* cited by examiner

METHOD AND APPARATUS FOR WIRELESS SIGNAL BASED LOCATION ENDPOINT TRIANGULATION USING 5G MMWAVE, LTE, AND WI-FI

This application is a continuation of prior application Ser. No. 16/779,420, entitled "METHOD AND APPARATUS FOR WIRELESS SIGNAL BASED LOCATION ENDPOINT TRIANGULATION USING 5G MMWAVE, LTE, AND WI-FI," filed on Jan. 31, 2020, which is assigned to the current assignee hereof and is incorporated herein by reference in its entirety.

FIELD OF THE DISCLOSURE

The present disclosure generally relates to wireless location systems for locating endpoint devices via of wireless signals. In particular, the present disclosure relates to locating endpoint devices utilizing diverse wireless signals available with communication capabilities to the endpoint device such as a mobile information handling systems having a plurality of wireless communication capabilities.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, communications with the information handling system may occur wirelessly via access to access points or base stations located within range of a network interface of the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
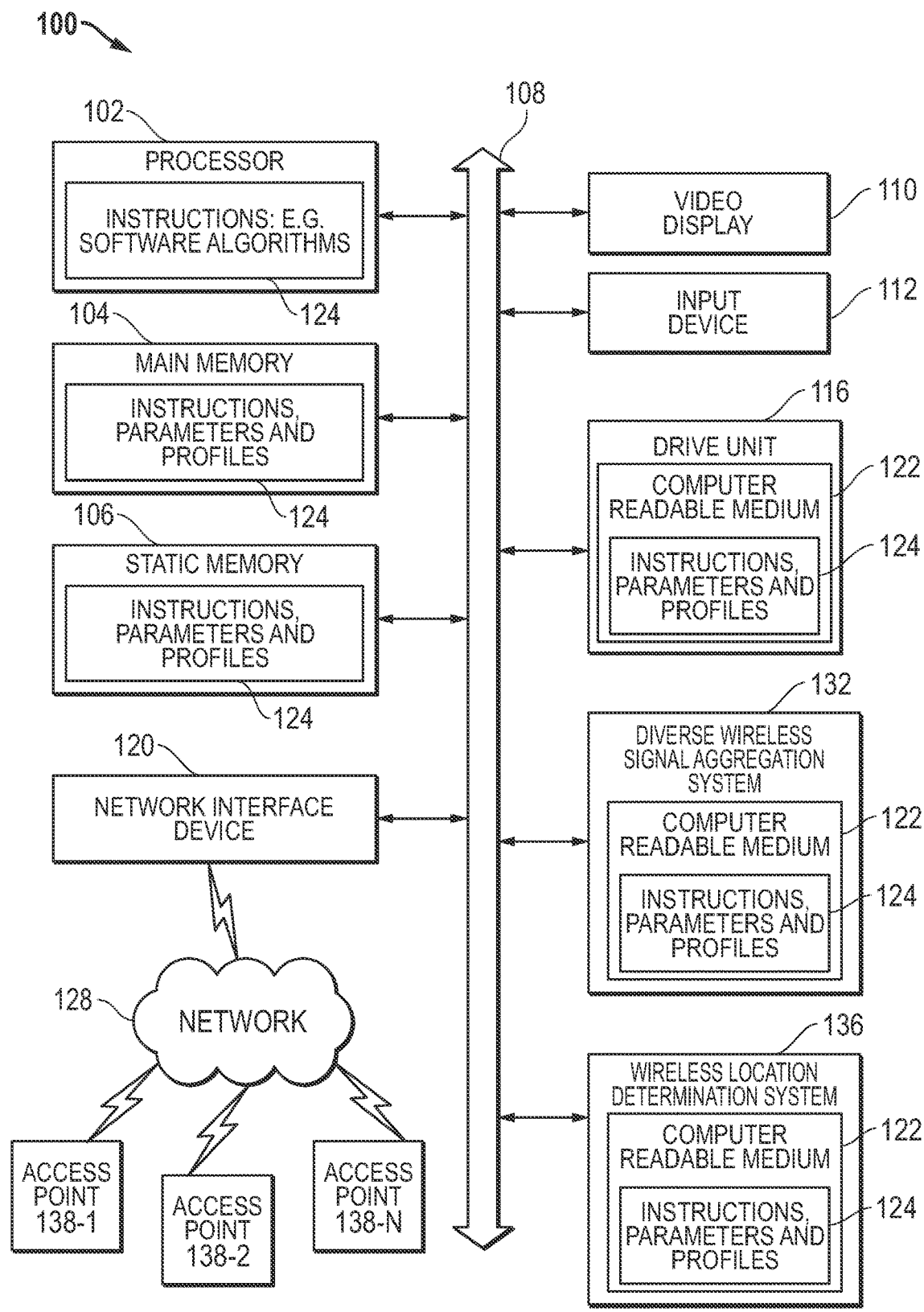
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As mobile computing infrastructure evolves worldwide to enable mobile information handling systems to transmit and receive larger amounts of data more quickly and easily while on the move, the variety of available wireless networks becomes more diverse. Tasks previously completed only on stationary information handling systems are now being completed on mobile devices. Mobile information handling systems and other endpoint devices are increasing being deployed with plural wireless antenna systems and wireless capabilities that span several wireless protocols. As 5G technology becomes more prevalent, increased levels of wireless bandwidth become available and new use cases and experiences become available for mobile information handling systems or other wireless endpoint devices. Much of the computing tasks and other operations may be increased and off-loaded to remote computing systems or databases. With the new use cases and experiences available with high bandwidth wireless capabilities, so too do the needs for an accurate ability of management services to learn or track endpoint wireless device locations, especially within buildings. Previous location systems such as global positioning systems (GPS) may not work well indoors. Triangulation and trilateration/multilateration techniques typically require at least three wireless nodes of a particular type to conduct wireless location determinations. However, it may frequently be the case that three nodes of a particular wireless protocol type may not be available, such as within an indoor space. In other embodiments, due to cost considerations, not all three or more nodes of a particular wireless protocol type may be disbursed such that signals from those nodes are viable for location determination purposes. This disbursement may be made to minimize overlap of node ranges and maximize coverage. Thus, not all nodes of a wireless protocol type will have sufficiently strong or reliable signal levels to make the distance or angle estimations of wireless triangulation or trilateration/multilateration to be reliable for location accuracy. For example, signal strength drop-off levels may indicate distance from a wireless nodes, but these drop-off levels begin to reach asymptotic values at far enough distances and may be subject to interference from intervening objects where distance estimations become less reliable.

With the increase in multiple wireless network protocols including legacy Wi-Fi and long-term evolution (LTE) wireless systems, as well as the release of spectrum in 5G mm-wave spectrum that may be separated into multiple bands for either sub 6 GHz spectrum or wireless networks operating in a variety of greater than 6 GHz frequency bands, several options of wireless networks may be available to a wireless-enabled endpoint device, such as an information handling system that has multiple types of wireless radio systems. Additionally, wireless connectivity to IoT wireless protocols and other wireless systems may be pertinent for some types of wireless endpoint devices. Each wireless network may include one or more wireless access points (APs) in communication with one or more mobile endpoint devices. In the event that three or more APs of a particular type of wireless protocol are not available in a space or some have poor signal quality levels, a diverse signal aggregation system of embodiments of the present disclosure may access wireless access points from diverse wireless protocols that may be within wireless communication range with a target wireless endpoint device.

In some embodiments, a central management system, such as for an enterprise user tracking numerous wireless endpoint devices, may aggregate the diverse wireless protocol signals from several APs to assess for signal strength levels and for diverse distance or angle determinations available from the variety of APs. Further, due to drawing from a diversity of wireless protocol APs, several distance or angle measurements may be assessed above the minimum three measurements needed for triangulation or trilateration. Accordingly, multiangulation or multilateration may be available. However, signal quality may vary among protocols as may precision of the various available wireless protocols in estimating position. Thus, a weighting system of available wireless protocols aggregated and used with multiangulation or multilateration and based on the signal levels may be used in embodiments herein to enhance accuracy and performance. In some embodiments, the processes described herein may be conducted on a wireless endpoint device with a plurality of available wireless radio for it to determine its own position as well.

FIG. 1 illustrates an information handling system 100 similar to information handling systems according to several aspects of the present disclosure. In embodiments presented herein, the information handling system 100 may include the information handling system 100 forming part of a wireless network and communicatively coupled to a plurality of access points 138-1, 138-2, . . . 138-N. In an embodiment, the information handling system 100 may be any endpoint computing device that interacts with the access points 138-1, 138-2, 138-N so as to communicate with the access points 138-1, 138-2, 138-N and/or other devices communicatively coupled to the information handling system 100 shown in FIG. 1. For example, the information handling system 100 may be one or more remote information handling systems to execute code instructions of a central management system, or a diverse wireless signal aggregation system according to embodiments herein. Further, one or more access points of embodiments herein may operate as an information handling system implementing some or all of the components and system described in the description of FIG. 1.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality. Although the present disclosure may refer to the use of a plurality of access points (i.e., wireless access point (WAP) or nodes) and at least one information handling system as being an interaction between a wireless access point device and a computing device, respectively, the present specification contemplates that other devices may be used in the present system as described herein.

In a networked deployment, the information handling system 100 may operate in the capacity of a server or as a client computer in a server-client network environment, or as a peer computer system in a peer-to-peer (or distributed) network environment. In a particular embodiment, the information handling system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

Elements within the information handling system 100 can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 can include one or more storage devices, one or more communications ports for communicating with external devices, as well as, various input and output (I/O) devices, such as a keyboard, a mouse, a video/graphic display, or any combination thereof. Elements of the information handling system 100 can also include one or more buses operable to transmit communications between the various hardware components. Portions of an information handling system 100 may themselves be considered information handling systems 100.

Elements of the information handling system 100 may include devices or modules that embody one or more of the devices or execute instructions for the one or more systems and modules described herein, and operates to perform one or more of the methods described herein. The information handling system 100 may execute code instructions 124 that may operate on servers or systems, remote data centers, access points, client devices, data points, or on-box in individual client information handling systems according to various embodiments herein. In some embodiments, it is understood any or all portions of code instructions 124 may operate on a plurality of information handling systems 100.

Elements of the information handling system 100 may include a processor 102 such as a central processing unit (CPU), control logic or some combination of the same. Any of the processing resources may operate to execute code that is either firmware or software code. Moreover, elements of the information handling system 100 can include memory such as main memory 104, static memory 106, computer readable medium 122 storing instructions 124 of the diverse wireless signal aggregation system 132, the diverse wireless location determination system 136, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

Elements, such as the information handling system 100 may further include a video display 110. The video display 110 in an embodiment may function as a liquid crystal display (LCD), an organic light emitting diode (OLED), a flat panel display, or a solid-state display. Additionally, the information handling system 100 may include an input device 112, such as a cursor control device (e.g., mouse, touchpad, or gesture or touch screen input, and a keyboard. The information handling system 100 can also include a disk drive unit 116.

The network interface device 120 shown as a wireless adapter, can provide connectivity to a network 128, e.g., a wide area network (WAN), a local area network (LAN), wireless local area network (WLAN), a wireless personal area network (WPAN), a wireless wide area network (WWAN), or other networks. Connectivity may be via wired or wireless connection. The wireless network interface device 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one wireless network interface device 120 may operate two or more wireless links. In embodiments herein, one or more wireless network interface devices 120 may provide wireless connectivity to a plurality of wireless protocol networks such as disparate wireless protocol access points such as access point 138-1, 138-2, and others through access point 138-N.

The wireless interface adapter 120 may operate in accordance with any wireless data communication standards. Wireless interface adapter 120 may include an antenna front end circuitry for receiving and transmitting signals, selecting channels, modulation/demodulation activity, and the like. Wireless interface adapter 120 may further include one or more antenna systems and radio frequency subsystems to support one or more wireless communication standards as outlined and discussed with reference to embodiments herein. In an embodiment, these wireless communication standards may include those wireless communication standards associated with Wi-Fi communications, Bluetooth® (BT) communications, and 4G and 5G wireless communications, among others. Further, as described further below, antenna system may include antenna array systems to provide multiple available wireless channels, such as for high bandwidth 5G wireless communications according to embodiments described herein. The various wireless communication protocols may be used in embodiments herein as part of the diverse wireless systems that may provide wireless location determination under the embodiments herein. Additionally, wireless interface adapter 120 may include one or more controllers such as antenna adaptation controller to support measurement of signal levels, time of flight determinations, or angles or attack or angles of departure for some system with arrays of antenna systems.

To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one wireless adapter 120 may operate two or more wireless links. Further, connectivity of the information handling system 100 to, for example, a 5G access point, may be available using any protocols related to a 5G new radio (NR) standard or similar standards as described herein.

Wireless adapter 120, in an embodiment, may connect to any 5G access point using a plurality of radio frequency (RF) bands that include both those RF bands associated with Wi-Fi communications, BT communications, LTE communications, and those RF waves associated with 5G NR communications. In an embodiment, the wireless interface adapter 120 may be communicatively coupled to an array of antennas used to communicate with 5G access point. In an embodiment, the antenna array may communicatively couple the information handling system with an 5G access point using a 5G NR connection. The wireless interface adapter 120 may also be operatively coupled to an array of antennas that emit RF waves higher than 6 GHz herein referred to a millimeter-wave (mm-wave) antennas. The mm-wave antennas may support a 5G wireless communication protocol so that relatively higher amounts of data may be transmitted between the information handling system 100 and any 5G access point of a network. In an embodiment, the wireless interface adapter 120 may be communicatively coupled to an array of antennas used to communicate with any nodes within a mesh network. In an embodiment, these nodes may include any bridges, switches, or other infrastructure devices that allow the triangulation module 126 of the information handling system 100 to receive or send transmission to triangulate the position of the information handling system 100 within an area or space.

Wireless network interface device 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both license and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are proprietary but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well.

Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands or 3.5 GHz conditional shared communication frequency bands under FCC Part 96. Wi-Gig ISM frequency bands that could be subject to sharing include 2.4 GHz, 5 GHz and 60 GHz bands or similar bands as understood by those of skill in the art. For embodiments herein, 5G NR frequency bands such as FR1 (e.g., n1-n3, n5, n7, n8, n12, n14, n18, n20, n25, n28-n30, n34, n38-n41, n48, n50, n51, n65, n66, n70, n71, n74-n84, n86, n89, and n90) and FR2 (e.g., n257, n258, n260, and n261) bands may be transceived at the antenna or antennas at the information handling system In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 128 can communicate voice, video or data over the network 128. Further, the instructions 124 may be transmitted or received over the network 128 via the network interface device or wireless adapter 120.

Elements of the information handling system 100 can include a set of instructions 124 that can be executed to cause the computer system to perform any one or more of the methods or computer-based functions disclosed herein. For example, instructions 124 may execute a diverse wireless signal aggregation system 132, or diverse wireless location determination system 136, software agents, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 116, diverse wireless signal aggregation system 132, and the diverse wireless location determination system 136 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. In an embodiment, the main memory device 104 or any other memory device may maintain certain data used to implement the processes and methods described herein. This data may include a TOF signal, a signal measurement degradation assessment, or an angle of attack or angle of departure phase change measurement between the information handling system 100 and each of the access points 138-1, 138-2, or 138-N. Such measurements may be used to assess distance or angle measurements between the endpoint device such as information handling system 100 and any of the access points 138-1, 138-2, or 138-N.

The disk drive unit 116 and static memory 106 may also contain space for data storage. Further, the instructions 124 may embody one or more of the methods or logic as described herein. For example, instructions relating to the diverse wireless signal aggregation system 132 software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the diverse wireless signal aggregation system 132 or diverse wireless location determination system 136 may be executed locally or remotely to generate location identification according to multiangulation or multilateration systems described in embodiments herein. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The diverse wireless signal aggregation system 132, or diverse wireless location determination system 136 may be stored in static memory 106, or the drive unit 116 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In an embodiment, the information handling system 100 may include the diverse wireless signal aggregation system 132 and the diverse wireless location determination system 136 that may be operably connected to the bus 108. The diverse wireless signal aggregation system 132 computer readable medium 122 may also contain space for data storage. The diverse wireless signal aggregation system 132 may, according to the present description, perform tasks related to aggregating plural signal data from a plurality of types of wireless protocol access points 138-1, 138-2, 138-N at known locations, including distance or angle measurements taken with that plurality of access points 138-1, 138-2, 138-N. In an embodiment, the diverse wireless signal aggregation system 132 may be in the form of computer readable program code executable by the processor 102 on a local or remote information handling system that receives signal strength data from, for example, the network interface device 120 or other device associated with the information handling system 100. In an embodiment, the diverse wireless signal aggregation system 132 may be in the form of an application specific integrated circuit (ASIC) that receives signal strength data from the network interface device 120.

The diverse wireless location determination system 136 may conduct the determination of location of an endpoint information handling system relative to the aggregated diverse wireless signal data from diverse wireless protocol access points. The determination may be made by the diverse wireless location determination system 136 as to signal level ratings, and whether signal levels are sufficient to be used as positional distance or angle data for multiangulation or multilateration position determination of an endpoint device in some embodiments. In further embodiments, the strength rating of the aggregated signals from the plurality wireless protocol types of access points 138-1, 138-2, 138-N may be used for determination of weighting values for multiangulation or multilateration determinations for wireless location assessments. In an embodiment, the diverse wireless location determination system 136 may be in the form of computer readable program code executable by the processor 102 on a remote information handling system central management system or a local endpoint information handling system that receives aggregated signal strength data or location distance or angle data. In an embodiment, the diverse wireless location determination system 136 may be in the form of an application specific integrated circuit (ASIC) that receives signal strength data aggregated from multiple access points.

In an embodiment, the diverse wireless signal aggregation system 132 and diverse wireless location determination system 136 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory.

In an embodiment, the information handling system 100 may include a diverse wireless location determination system 136 that may be operably connected to the bus 108. The diverse wireless location determination system 136 computer readable medium 122 may also contain space for data storage. The diverse wireless location determination system 136 may, according to the present description, perform tasks related to rating diverse wireless signals, selecting signals aggregated from one or more access points 138-1, 138-2, 138-N for use in location determination, and applying any weighting to the diverse distance or angle measurements applied during multiangulation or multilateration. Distance measurements may include the time interval taken by a signal through a medium under the diverse protocols accepted by the diverse wireless location determination system 136 for multilateration or multiangulation. In a specific embodiment, the diverse wireless location determination system 136 received aggregated distance signals from multiple wireless protocols that include a measurement of the duration of time a signal is sent to or received by and a response signal is received by or sent by (respectively) an information handling system 100 or any of the diverse protocol access points 138-1, 138-2, 138-N. In this embodiment, the time of flight data may include timestamp data from the access points 138-1, 138-2, 138-N that indicates when the access points 138-1, 138-2, 138-N sent the signal thereby indicating the time of flight value. Alternative embodiments include a series of signals passed between the information handling system 100 and any individual access point 138-1, 138-2, 138-N so as to determine an average time of flight value over the series of sent signals. Again, the signal sent to and from the access points 138-1, 138-2, 138-N and/or information handling system 100 may include a time stamp indicating the time the signal was sent. In an embodiment, the aggregated distance measurements received at the diverse wireless location determination system 136 may include use of TOF protocols for various wireless protocols, such as 802.11mc protocol which is the Wi-Fi® Round-trip-Time (Wi-Fi RTT) protocol used to measure the distance to nearby Wi-Fi® access points and used to determine an location of the information handling system 100 within 1-2 meters. Other protocols may apply to Bluetooth such as Bluetooth® proximity tracking under the Bluetooth® protocol 5.1 location methods, LTE distance measurement protocols, and similar protocols in other wireless network protocols that may be utilized in embodiments herein.

The diverse wireless location determination system 136 may also, according to the present description, receive aggregated data related to measuring a power present in a received wireless signal such as a signals received by the information handling system 100 from a plurality of diverse protocol access points 138-1, 138-2, 138-N. In an embodiment, the diverse wireless location determination system 136 may be in the form of computer readable program code executable by the processor 102 that receives aggregated signal strength data (e.g., received signal strength indicator (RSSI)) measured from, for example, the network interface devices of access points 138-1, 138-2, or 138-N or from the endpoint network interface device 120 or other device associated with the information handling system 100 and aggregated by the diverse wireless signal aggregation system 132.

In an embodiment, the diverse wireless location determination system 136 may communicate with the main memory 104, the processor 102, the video display 110, the alphanumeric input device 112, and the network interface device 120 via bus 108, and several forms of communication may be used, including ACPI, SMBus, a 24 MHZ BFSK-coded transmission channel, or shared memory. This communication allows for the diverse wireless location determination system 136 to receive the data related to the signal strength of a received signal from an access point 138-1, 138-2, 138-N and provide data representative of any decrease in signal strength over some period of time (i.e., over nanoseconds).

The diverse wireless location determination system 136 may compare the RSSI data to the time of flight (TOF) data to detect a reduction in power of the signal strength (resulting from substantial distance from an access point or the signal passing through a structure) relative to the time the signal took to be received by either or both of the information handling system 100 or network interface device 120. The reduction in RSSI relative to the TOF data may indicate a barrier or object such as a wall is present between any of the access points 138-1, 138-2, 138-N and any information handling system 100 within the network operating the systems and methods described herein.

Distances may be determined through the use of the TOF data received by the information handling system 100 and, specifically, the network interface device 120. Because the signals are propagated at the speed of light, this constant value may be used on connection with a time stamp to determine the distance between the information handling system 100 and the plurality of the access points 138-1, 138-2, 138-N.

In an embodiment, the information handling system may detect the presence of a plurality of diverse wireless protocol access points 138-1, 138-2, 138-N and identify those access points 138-1, 138-2, 138-N by their respective MAC addresses. In this embodiment, any given access point 138-1, 138-2, 138-N may have a respective TOF value and corresponding RSSI value associated with it. These TOF and RSSI values from among the access point 138-1, 138-2, 138-N and information handling system 100 pairs are aggregated by the diverse wireless signal aggregation system according to some embodiments herein. These unique set of TOF and RSSI values relative to the diverse protocol access points 138-1, 138-2, 138-N MAC addresses may be used as an address-identified fingerprint for known locations of the access points 138-1, 138-2, 138-N assigned those MAC addresses. Consequently, the TOF and RSSI values described herein may be used by the information handling system 100 to determine the locations of the information handling system 100 relative to the access points 138-1, 138-2, 138-N without additional location data such as GPS or architectural-based location data and may be utilized under some embodiments in multiangulation or multilateration determination of the endpoint location.

In some embodiments, the information handling system 100 may be any type of computing device communicatively coupled, either via wire or wirelessly, to any number of devices within a network. In an example, the information handling system 100 is a computing device that includes a processor 102, a main memory device 104, static memory device 106, video display 110, input device 112, drive unit 116, diverse wireless signal aggregation system 132, and diverse wireless location determination system 136. In an embodiment, the information handling system 100 shown in FIG. 1 may by one of many different and distinct information handling systems 100 communicatively coupled within the network to perform the processes and methods described herein.

In some embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. In an embodiment an information handling system 100 of the information handling system 100 may include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
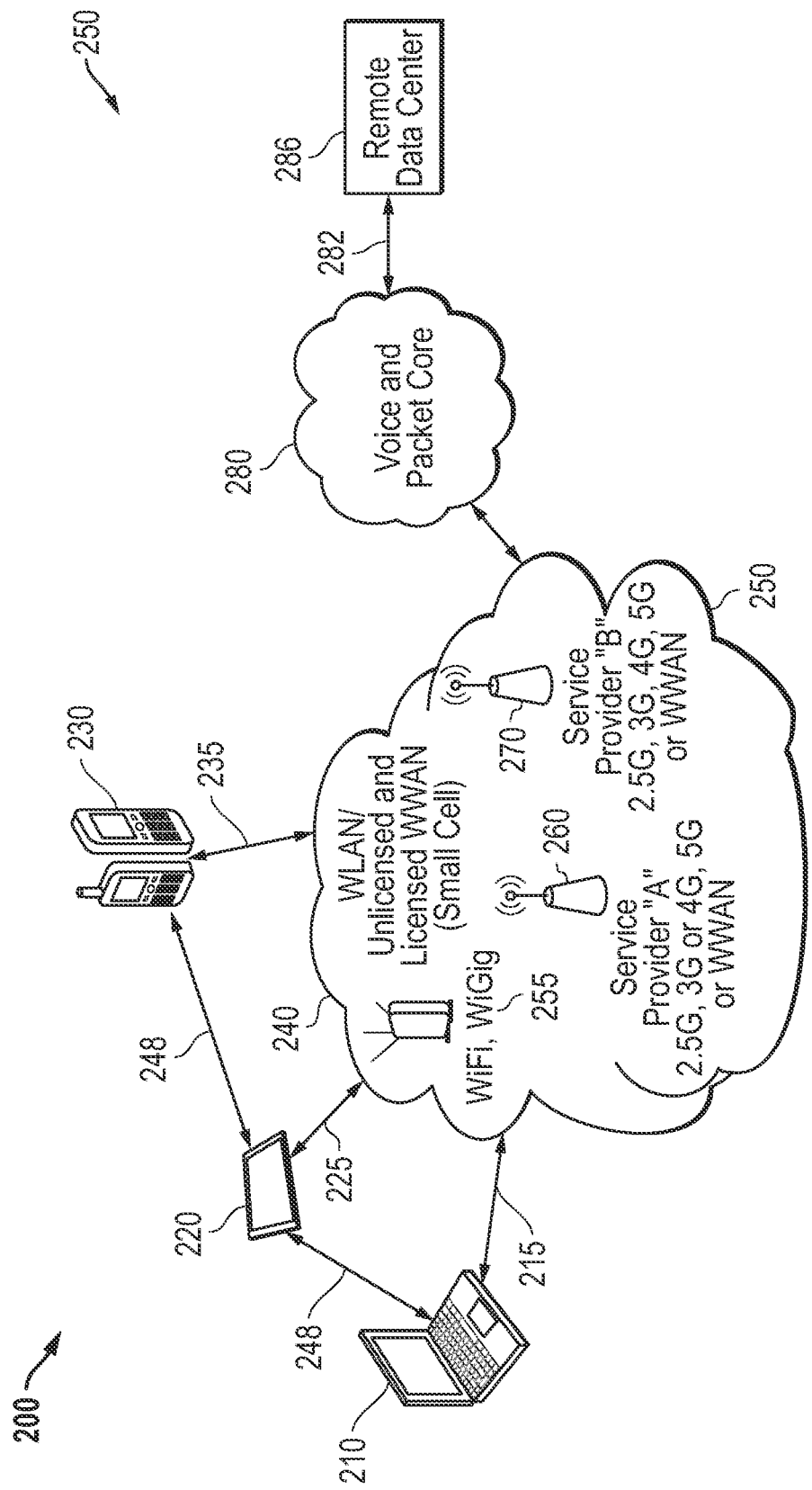
FIG. 2 is a block diagram of a network environment offering several communication protocol options and mobile information handling systems according to an embodiment of the present disclosure.

FIG. 1 shows an information handling system 100 capable of administering each of the specific embodiments of the present disclosure. The information handling system 100, in an embodiment, can represent the mobile information handling systems 210, 220, and 230 or servers or systems located anywhere within network 200 described in connection with FIG. 2 herein, including the remote data centers operating virtual machine applications. FIG. 2 is a block diagram of a network environment 200 offering several communication protocol options and mobile information handling systems according to an embodiment of the present disclosure. FIG. 2 illustrates a network 200 that can include one or more information handling systems 210, 220, 230 that may include the information handling system described in connection with FIG. 1. In a particular embodiment, network 200 includes networked mobile information handling systems 210, 220, and 230, 5G wireless access points, and multiple wireless connection link options. A variety of additional computing resources of network 200 may include client mobile information handling systems, data processing servers, network storage devices, local and wide area networks, or other resources as needed or desired. As partially depicted, systems 210, 220, and 230 may be a laptop computer, tablet computer, 360-degree convertible systems, wearable computing devices, a smart phone device or other computing devices. These mobile information handling systems 210, 220, and 230, may access a wireless local network 240, or they may access a macro-cellular network 250 via the 5G access points or 5G access points. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option such a 5G NR gNodeB access point or E-UTRAN eNodeB access point.

Components of a wireless local network may be connected by wireline or Ethernet connections to a wider external network. For example, wireless 5G access points may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, or 5G small cell WWAN communications such as eNodeB, IEEE 802.11, IEEE 1914/1904, IEEE P2413/1471/42010, or similar wireless network protocols developed for 5G communications. In an embodiment, the networked mobile information handling systems 210, 220, and 230 may communicate via any 5G protocol used to transmit mm-wave frequencies.

Alternatively, other available wireless links within network 200 may include macro-cellular connections 250 via one or more service providers 260 and 270. Service provider macro-cellular connections may include 2G standards such as GSM, 2.5G standards such as GSM EDGE and GPRS, 3G standards such as W-CDMA/UMTS and CDMA 2000, 4G standards, or 5G standards including WiMAX, LTE, and LTE Advanced, LTE-LAA, small cell WWAN such as 5GNR, and the like. Wireless local network 240 and macro-cellular network 250 may include a variety of licensed, unlicensed or shared communication frequency bands as well as a variety of wireless protocol technologies ranging from those operating in macrocells, small cells, picocells, or femtocells.

In some embodiments according to the present disclosure, a networked mobile information handling system 210, 220, or 230 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple antenna systems to enhance wireless data bandwidth. Similarly, a single antenna or plural antennas may be used on each of the wireless communication devices so that the beamforming processes may be engaged in as described herein. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands or 3.5 GHz conditional shared communication frequency bands under FCC Part 96. Wi-Gig ISM frequency bands that could be subject to sharing include 2.4 GHz, 5 GHz and 60 GHz bands or similar bands as understood by those of skill in the art. For embodiments herein, 5G NR frequency bands such as FR1 (e.g., n1-n3, n5, n7, n8, n12, n14, n18, n20, n25, n28-n30, n34, n38-n41, n48, n50, n51, n65, n66, n70, n71, n74-n84, n86, n89, and n90) and FR2 (e.g., n257, n258, n260, and n261) bands may be transceived at the antenna or antennas. Within local portion of wireless network 250 access points for Wi-Fi or WiGig as well as small cell WWAN connectivity may be available in emerging 5G technology. This may create situations where a plurality of antenna systems are operating on a mobile information handling system 210, 220 or 230 via concurrent communication wireless links on both WLAN and WWAN or multiple concurrent wireless link to enhance bandwidth under a protocol and which may operate within the same, adjacent, or otherwise interfering communication frequency bands. The antenna or the individual antennas of an antenna array may be transmitting antennas that includes high-band, medium-band, low-band, and unlicensed band transmitting antennas. Alternatively, embodiments may include a single transceiving antennas capable of receiving and transmitting, and/or more than one transceiving antennas. In various embodiments herein, information handling systems 210, 220, or 230 may include plural diverse wireless capabilities from a selection of the wireless networks depicted to assist in wireless location determination according to embodiments herein.

The voice and packet core network 280 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile information handling systems such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, or other network structure. In one example embodiment, an initial from the wireless network or wireless networks may be via connection to an internal IP network connection for an enterprise as shown in FIG. 3. The initial connection to an internal IP network may include connection to remote computing systems within the internal IP network that may operate a central management system to execute the one or more operations for wireless location determinations according to embodiments herein. Such a connection may be made via an access point/Ethernet switch to the internal network. Further, a connection 282 may be made via an access point/Ethernet switch to an external network and may be a backhaul connection such as to the remote data center 286 in some embodiments.

Any access point may be connected to one or more wireless access points before connecting directly to a mobile information handling system or may connect directly to one or more mobile information handling systems 210, 220, and 230. Alternatively, mobile information handling systems 210, 220, and 230 may connect to the internal IP network or external network via base station locations at service providers such as 260 and 270. These service provider locations may be network connected via backhaul connectivity through the voice and packet core network 280 to an internal or external IP network.

Internal remote computing systems and remote data centers 286 as shown may include web servers or resources within a cloud environment that operate via the voice and packet core 280 or other wider internet connectivity and may reside inside or external to a firewall. For example, internal remote computing systems and remote data centers 286 can include additional information handling systems, data processing servers, network storage devices, local and wide area networks, or other resources as needed or desired. Having such remote capabilities may permit fewer resources to be maintained at the mobile information handling systems 210, 220, and 230 allowing streamlining and efficiency within those devices. In an example where the mobile information handling system 210, 220, and 230 require aggregation of diverse wireless protocol signals to conduct distance, angle, signal strength measurements or other location related assessments from a plurality of wireless network protocols, those processing resources may be located at the internal remote computing or remote data centers for an enterprise or 5G application to utilize such location intensive data as described herein. Additionally, comparison and determination of diverse wireless system signals received relating to distance, angle, or wireless signal strength for computation of refined wireless location determination may consume processing and memory resources which may be off-loaded in some embodiments from an endpoint information handling system 210, 220, or 230 that is being located. Similarly, internal remote computing systems or remote data center permits fewer resources to be maintained in other parts of network 200. In other embodiments, either or both of the aggregation or wireless location determination of embodiments described herein may take place on an endpoint information handling system 210, 220, or 230 to determine location.

Although 215, 225, and 235 are shown connecting wireless adapters of mobile information handling systems 210, 220, and 230 to wireless networks 240 or 250, a variety of wireless links are contemplated. Wireless communication may link through a wireless access point (Wi-Fi or WiGig), through unlicensed WWAN small cell base stations such as in network 240 or through a service provider tower such as that shown with service provider A 260 or service provider B 270 and in network 250. In other aspects, mobile information handling systems 210, 220, and 230 may communicate intra-device via 248 when one or more of the mobile information handling systems 210, 220, and 230 are set to act as a 5G access point or even potentially a WWAN connection via small cell communication on licensed or unlicensed WWAN connections. Concurrent wireless links to information handling systems 210, 220, and 230 may be connected via any access points including other mobile information handling systems as illustrated in FIG. 2.

Figure 3A:
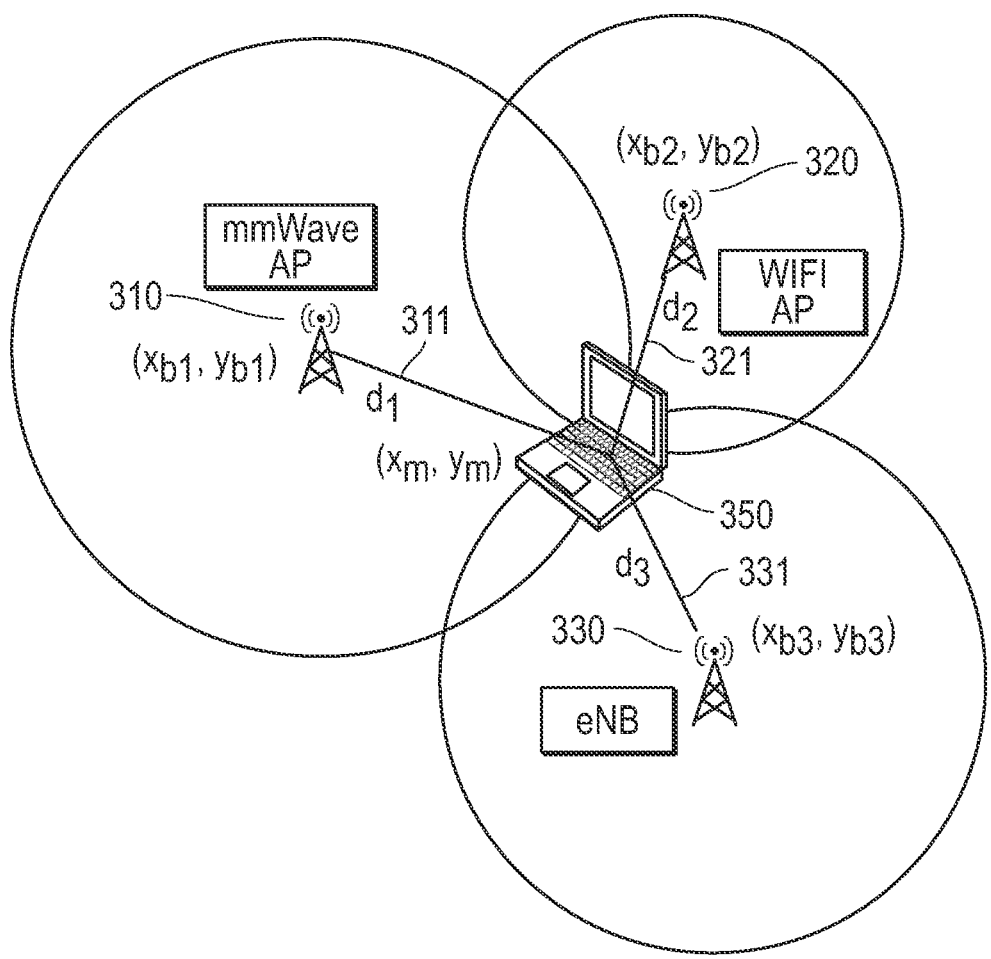
FIG. 3A is a graphical block diagram of a diverse signal utilization for wireless location determination of endpoint device location according to an embodiment of the present disclosure.

FIG. 3A shows a graphical block diagram illustrating multiangulation or multilateration of an endpoint information handling system with plural wireless protocol capabilities according to an embodiment of the present disclosure. In a particular embodiment, triangulation or trilateration wireless determination of a location ($x_m$, $y_m$) an endpoint information handling system 350 is shown using three wireless nodes 310, 320 and 330. The endpoint information handling system 350 shown in the example embodiment of FIG. 3A may actively enable wireless signal exchange in three wireless bands for three diverse wireless protocols.

The endpoint information handling system 350 may communicate with a first wireless node 310 in a mm-wave frequency band such as used with 5G NR protocols such as a 5G NR gNodeB node. First wireless node 310 may have a known position ($x_{b1}$, $y_{b1}$). The 5G mm-wave access point may, via time or flight, signal degradation, or other distance measures in embodiments, determine a distance $d_1$ via a signal 311 exchanged with the endpoint information handling system 350. The accuracy of the distance $d_1$ may depend on the wireless protocol, the quality of the signal 311 exchanged with the endpoint device 350, and other factors. For example, the magnitude of distance from the endpoint device 350, intervening objects between the first wireless node 310 and the endpoint device 350, or existing levels of wireless interference from environment conditions may impact the distance determination $d_2$ under various embodiments from the first type of mm-wave wireless protocol. Further, in some embodiments where an array of antenna elements is used, such as the planar array of 5G mm-wave antennas that may be deployed with a 5G NR wireless protocol system, the mm-wave access point 310 and the endpoint device 350 may conduct an angle calculation to determine and angle between mm-wave access point 310 and endpoint device 350. For example, using phase changes detected across the array of receiving mm-wave antennas at either the mm-wave node 310 or the endpoint device 350, an angle of attack (AoA) determination may be made in one embodiment. Similarly phase shifts of sent signals transmitted from an array of transmitting mm-wave antennas at either the mm-wave node 310 or the endpoint device 350 may be used to detect an angle of departure (AoD) from the transmitting antenna array. Such angular data determination may be used with respect to triangulation or trilateration determinations of location according to embodiments herein in addition to distance determinations. In other embodiments, relative known positions of access points 310, 320, and 330 may be used to determine angular relationships between them for purposes of triangulation or trilateration location determinations.

The endpoint information handling system 350 may communicate with a second wireless node 320 in a Wi-Fi frequency band for a WLAN protocol such as a Wi-Fi node. Second wireless node 320 may have a known position ($x_{b2}$, $y_{b2}$). The Wi-Fi access point may, via time or flight, signal degradation, or other distance measures in various embodiments, determine a distance $d_2$ via a signal 321 exchanged with the endpoint information handling system 350. The accuracy of the distance $d_2$ may again depend on the wireless protocol, the quality of the signal 321 exchanged with the endpoint device 350, and other factors. For example, the magnitude of distance from the endpoint device 350, intervening objects between the second wireless node 320 and the endpoint device 350, or existing levels of wireless interference from environment conditions may impact the distance determination $d_3$ under various embodiments from the second type of wireless protocol. For Wi-Fi systems deploying an array of antennas, angle determinations may similarly be made according to the above embodiments in some embodiments. In other embodiments, relative known positions of access points 310, 320, and 330 may be used to determine angular relationships between them.

The endpoint information handling system 350 may communicate with a third wireless node 330 in an LTE frequency band for a small cell WWAN protocol such as an eNodeB node. Third wireless node 330 may have a known position ($x_{b3}$, $y_{b3}$). The eNodeB access point may, via time or flight, signal degradation, or other distance measures in various embodiments, determine a distance $d_3$ via a signal 331 exchanged with the endpoint information handling system 350. The accuracy of the distance $d_3$ may again depend on the wireless protocol, the quality of the signal 331 exchanged with the endpoint device 350, and other factors. For example, the magnitude of distance from the endpoint device 350, intervening objects between the third wireless node 330 and the endpoint device 350, or existing levels of wireless interference from environment conditions may impact the distance determination $d_1$ under various embodiments from the third type of wireless protocol. For eNodeB systems deploying an array of antennas, angle determinations may similarly be made according to the above embodiments in some embodiments. In other embodiments, relative known positions of access points 310, 320, and 330 may be used to determine angular relationships between them.

Thus, in some embodiments, distance measurements $d_1$, $d_2$, and $d_3$ may be determined from three distinct wireless protocols and measured via three different wireless access points 310, 320, and 330. Other wireless access point nodes may not be in range or available at a location of the endpoint information handling system 350. Nonetheless, the signal data for signal distance or angle measurements of 311, 321 and 331 respectively coming via three different wireless access points 310, 320, and 330. Further, the three different wireless access points 310, 320, and 330 are at known locations ($x_{b1}$, $y_{b1}$), ($x_{b2}$, $y_{b2}$), and ($x_{b3}$, $y_{b3}$).

With this information aggregated from the three (or more) different wireless protocols and access point nodes 310, 320, and 330, the location ($x_m$, $y_m$) of the endpoint information handling system may be assessed via multiangulation and multilateration. For example, with distances measured from known access point locations, multiangulation or multilateration may be used to find an intersection of distance ranges from the known locations ($x_{b1}$, $y_{b1}$), ($x_{b2}$, $y_{b2}$), and ($x_{b3}$, $y_{b3}$) of the diverse access points 310, 320, and 330 when such data is aggregated. However, the distance ranges $d_1$, $d_2$, and $d_3$ may have a degree of inaccuracy due to signal levels, wireless conditions, intervening objects, and depending on the type wireless frequency bands used with the distance determination. For example, higher frequency wireless bands may require more line-of-sight exchange of signals and closer distances but may provide more accurate distance assessments at close ranges while lower frequency band may provide for longer range but less accuracy of distance assessment. Similarly, angle measurements where available from one or more wireless protocol types of diverse wireless nodes 310, 320 and 330 may further assist in multiangulation or multilateration determinations of location ($x_m$, $y_m$) of the endpoint information handling system. Such angle data may further be aggregated, where available, for use with available or sufficient signal strength diverse wireless protocol signals 311, 321, and 331 in determining location ($x_m$, $y_m$) of the endpoint information handling system.

In various embodiments, the available different wireless access points 310, 320 and 330 may be various combinations of wireless protocols including situations where two of one protocol type, but not a third, are available with distance or angle measurements possible. In further embodiments, due to the variation of signal strengths or variations in capability of varying bands of the diverse wireless protocols to accurately determine distance or angle information, the multiangulation or multilateration maybe weighted. In further embodiments, distance or angle data from several reference point wireless access point nodes above three reference points may be used to refine the wireless location determination of the endpoint information handling system location ($x_m$, $y_m$). Such location determinations may involve execution of code instructions of a diverse wireless signal aggregation system and a diverse wireless location determination system on the endpoint wireless information handling system in some embodiments. In other embodiments, the location determinations may involve execution of code instructions of some or all of either or both the diverse wireless signal aggregation system and the diverse wireless location determination system on remote information handling system such as an enterprise central management system in various embodiments herein.

Figure 3B:
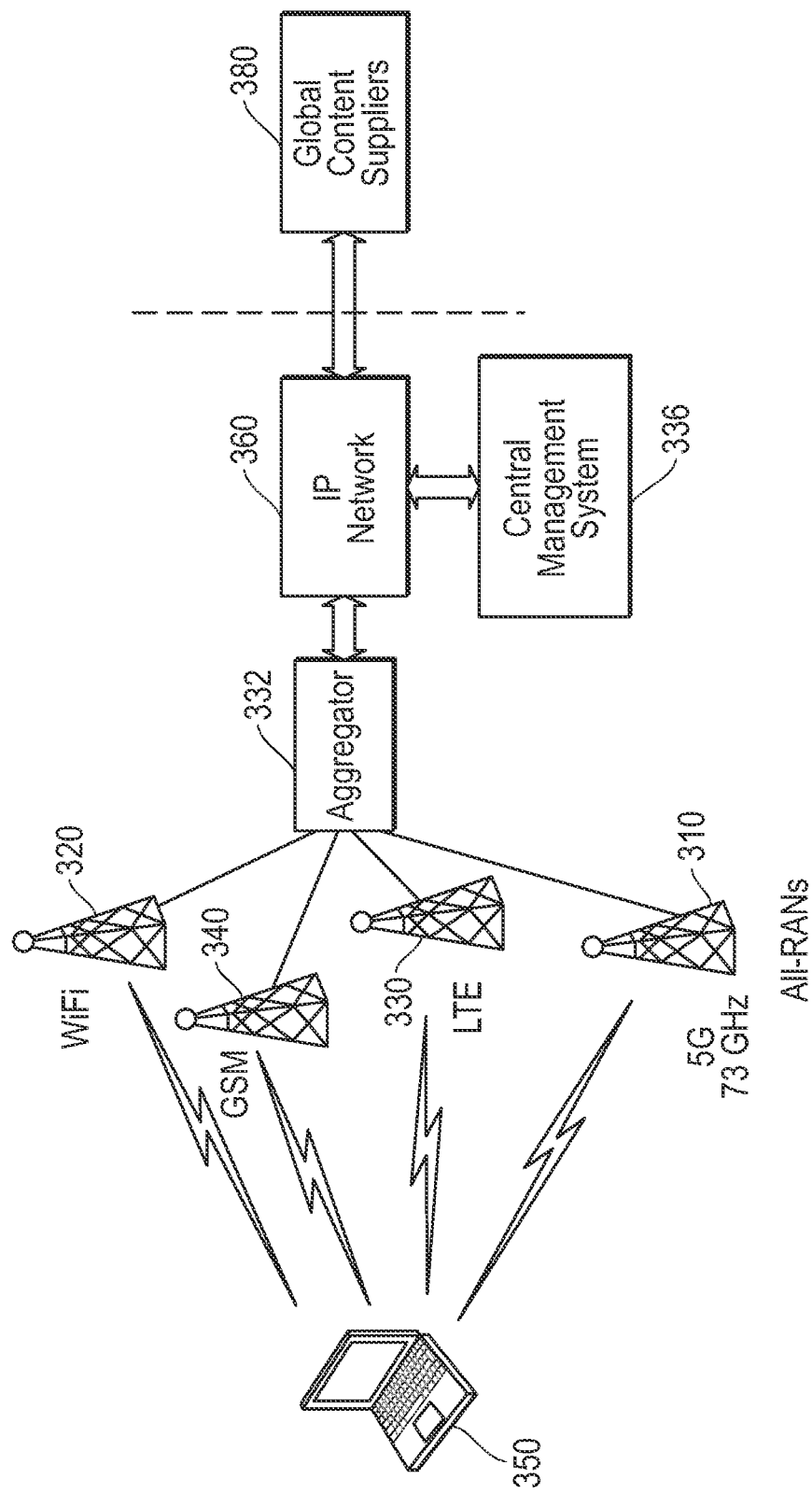
FIG. 3B is a block diagram of a diverse signal aggregation system for wireless location determination of endpoint device location according to an embodiment of the present disclosure.

FIG. 3B shows a graphical block diagram illustrating components of a diverse wireless signal aggregation system and the diverse wireless location determination system via a central management system 336 to conduct refined multiangulation or multilateration of an endpoint information handling system 350 according to an embodiment of the present disclosure. In an example embodiment, an endpoint information handling system 350 with plural wireless protocol capabilities may be assessed for wireless location determination according to an embodiment. In particular embodiments, multiangulation or multilateration wireless determination of a location of an endpoint information handling system 350 may be determined using plural wireless nodes 310, 320, 330, and 340. The endpoint information handling system 350 shown in the example embodiment of FIG. 3B may actively enable wireless signal exchange in multiple wireless bands for multiple diverse wireless protocols. While four diverse wireless protocols are shown, it is contemplated that at any given location of an endpoint device 350, any array of diverse wireless access points may be available including two of the same type of wireless access point. However, in many locations, three access points of the same wireless protocol may not be available or provide a sufficiently strong signal to yield a reliable or accurate wireless location assessment with only one wireless protocol type.

In the shown embodiment of FIG. 3B, the diverse wireless signal aggregation system 332 and the diverse wireless location determination system may conduct diverse wireless location determination via a central management system 336. The endpoint information handling system 350 may communicate with the plurality of diverse wireless nodes such as node 310 in a mm-wave frequency band such as used with 5G NR protocols such as a 5G NR gNodeB node, node 320 in a Wi-Fi frequency band for a WLAN protocol such as a Wi-Fi node, node 330 in an LTE frequency band for a small cell WWAN protocol such as an eNodeB node, and node 340 in a GSM frequency band for wireless communication. Each available diverse wireless node may conduct distance assessment or angle assessment via signal exchange with the endpoint information handling system 350 according to various embodiments and methods of those protocols. Those distance data or angle data assessments may include time of flight data, signal strength information, phase shift information if available, and other signal exchange data. The upon determination that one single location determination protocol is unavailable, the distance data or angle data assessments may be sent to a diverse wireless signal aggregation system 332. As described, this diverse wireless signal aggregation system 332 may reside at a remote information handling system or may be gathered at the endpoint information handling system 350 in some embodiments. The aggregation may be conducted for example by an enterprise for a user's endpoint information handling system 350 that is managed by the enterprise and which may manage one or more of the diversity of wireless protocol networks being utilized.

The aggregated distance data or angle data assessments from the diversity of wireless protocols by the diverse wireless signal aggregation system 332 may be sent via an internal IP network 360 to an internal central management system 336 of the remote information handling system in some embodiments. In other embodiments, the diverse wireless signal aggregation system 332 and the diverse wireless location determination system reside on the same information handling system or systems of the central management system 336. The diverse wireless location determination system may conduct diverse wireless location determination via a central management system 336 according to the multiangulation or multilateration determinations or refined assessments described in various embodiments herein. In some embodiments, the aggregated distance data or angle data assessments from the diversity of wireless protocols may be transmitted by a diverse wireless signal aggregation system 332 to a diverse wireless location determination system located at global content suppliers 380 outside of a firewall or security controlled access to the internal IP network 360 to conduct diverse wireless location determination. In yet other embodiments, the endpoint information handling system wirelessly determined location from aggregated distance data or angle data assessments from the diversity of wireless protocols may be shared with global content suppliers 380 for utilization with applications or services requiring location information for endpoint devices 350. Such location information may be encrypted or otherwise secured according to techniques understood in the art.

Figure 4:
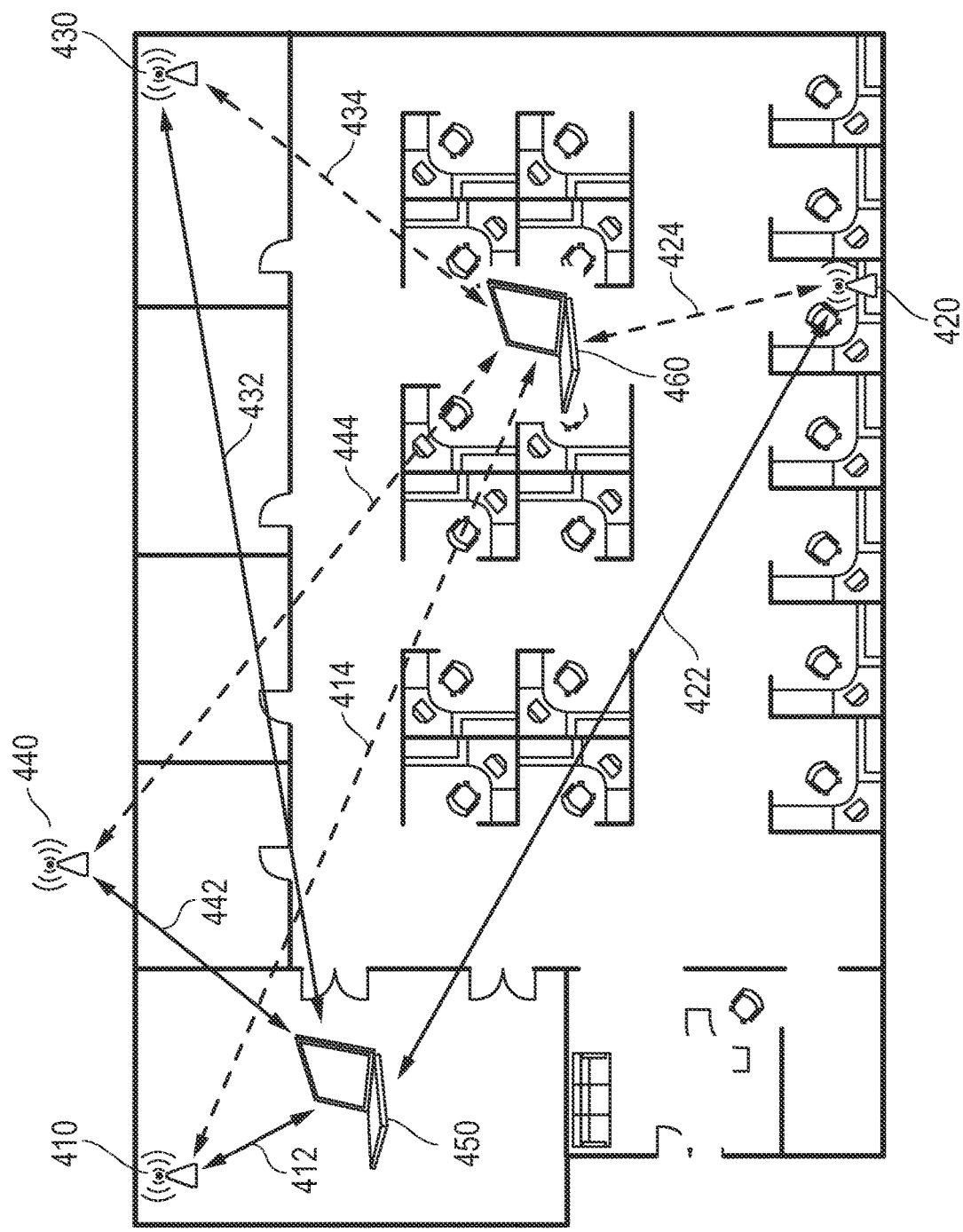
FIG. 4 is a graphic diagram illustrating a plurality of mobile information handling systems and diversity of wireless network options for wireless location determination within an indoor setting according to an embodiment of the present disclosure.

FIG. 4 is a graphic diagram illustrating a plurality of mobile information handling systems 450 and 460 located within an indoor area and in communication with a plurality of access points 410, 420, 430 and 440 according to an embodiment of the present disclosure. As described herein, the plurality of access points 410, 420, 430 and 440 may include a variety of wireless protocols as discussed above in various embodiments herein. In the embodiment presented in FIG. 4, four access points 410, 420, 430, and 440 have been deployed both inside and outside of a building indoor environment. These access points 410, 420, 430, and 440 may be communicatively coupled to diverse wireless networks as well as any number of information handling systems, including mobile information handling systems 450 and 460 in an embodiment.

Access points 410, 420, 430, or 440 in various embodiments may operate in a variety of licensed or unlicensed bands, and may operate in any number of radio frequency bands and according to a diversity of wireless protocols as described with respect to embodiments herein.

In an embodiment, any/all of the access points 410, 420, 430, and 440 may transmit broadcast signals, which may be received at the mobile information handling systems 450, 460, or other information handling systems. Information within these received broadcast signals in an embodiment may be used to determine a relative distance of any single access point to a mobile information handling system. For example, these signals from each of the plurality of access points may include a time stamp indicative of when the signal was sent. In a specific embodiment, the Time of Flight (TOF) values sent to and/or received from each of the access points 410, 420, 430, and 440 may be used to multiangulate or multilaterate a position of the mobile information handling system 450 or 460 relative, at least, to each of the access points 410, 420, 430, and 440. However, this is currently available for the same wireless protocols operating on each of the access points 410, 420, 430, and 440. This process may include comparing the timestamp of the signals from each of the plurality of access points (e.g., 410, 420, 430, 440) to the time the signal is received by the information handling systems 450 or 460 from each of those points to calculate a time difference and associate the same with a MAC address of each of the in-range access points (e.g., 410, 420, 430, 440) having a known position. However, in many situations, the three same wireless protocol type access points may not be available, especially in an indoor environment. However, as more wireless systems are deployed for a variety of wireless communication options, and as mobile information handling systems 450 and 460 are deployed having plural wireless capabilities in those diverse wireless protocols, the system of embodiments of the present disclosure may leverage the available diverse wireless protocols to assess wireless location determination of the endpoint mobile information handling systems such as 450 and 460.

It may be that, in an indoor environment such as shown, three or more wireless access point nodes from the same wireless communication protocol are not available to conduct standard multiangulation or multilateration to determine locations of mobile information handling systems 450 and 460. Further, in an indoor environment, multiple obstacles may intervene between the plurality of access points 410, 420, 430 and 440 and the mobile information handling systems 450 and 460. In some cases, some of the plurality of access points such as 410, 420, and 430 may be located inside, while others such as AP 440 may be located outside the building. Nonetheless, depending on signal strength and type of wireless protocol radiofrequency bandwidths among other factors, any of the diverse wireless protocols among the plurality of access points 410, 420, 430 and 440 may be utilized to determine distances or angles from the known access point locations for multiangulation or multilateration to be conducted to provide a diverse wireless location determination for endpoint mobile information handling systems 450 and 460.

Multiple mobile information handling systems operating within an office in an embodiment may have differing combinations of wireless capability. Further, multiple mobile information handling systems operating within an office in an embodiment may have differing proximity and signal strength levels with APs 410, 420, 430, and 440 and which may include differing numbers of intervening obstacles and the like. For example, a signal 442 from AP 440 may come from an external location but may be physically closer to mobile information handling system 450 and only travel through two walls as compared to a signal from AP 430 which may be further away and need to travel through four wall. However, for mobile information handling system 460, a signal 434 from AP 430 may be closer and need to travel through only two walls, while a signal 444 must travel through four walls including an external wall from AP 440. Thus, each of the mobile information handling systems 450 and 460 may have distance (and angle) wireless measurement data that may vary with signal strength and accuracy as it relates to the set of available diverse protocol wireless APs 410, 420, 430, and 440 in or around a building.

In example embodiments, the wireless signal based location determination system in an embodiment may multiangulate or multilaterate the position of mobile information handling system 450 with respect to one or more of APs 410, 420, 430, or 440 based on TOF for a wireless link 412 with AP 410, wireless link 422 with AP 420, wireless link 432 with AP 430, or wireless link 442 with AP 440 and assess detected RSSI values of these wireless links 412, 422, 432, and 442. Since the data from APs 410, 420, 430, and 440 come from a plurality of wireless protocols and APs that may not directly communicate with one another, a diverse wireless signal aggregation system must pull this data relative to each of the wireless protocols such as from APs 410, 420, 430, and 440 or from data measured and collected at endpoint mobile information handling system 450. A diverse wireless location determination system may execute multiangulation or multilateration algorithms on the aggregated diverse wireless signal distance and signal strength data to yield a location estimation of the endpoint wireless information handling system. In embodiments herein, the diverse wireless location determination system may execute the algorithmic determination of location at a remote information handling system in some embodiments, such as for purposes of tracking assets in an enterprise and utilizing such data for various wireless use cases enabled by increased wireless bandwidth and which may be dependent on location of endpoint devices. In other embodiments, the diverse wireless location determination system may execute the algorithmic determination of location on the endpoint information handling system for determination of its own location.

As another example, the wireless signal based location determination system in an embodiment may multiangulate or multilaterate the position of mobile information handling system 460 with respect to one or more of APs 410, 420, 430, or 440 based on TOF for a wireless link 414 with AP 410, wireless 424 with AP 420, wireless link 434 with AP 430, or wireless link 444 with AP 440 and assess detected RSSI values of these wireless links 414, 424, 434, and 444. Again, since the data from APs 410, 420, 430, and 440 come from a plurality of wireless protocols and APs that may not directly communicate with one another, a diverse wireless signal aggregation system must pull this data relative to each of the wireless protocols such as from APs 410, 420, 430, and 440 or from data measured and collected at endpoint mobile information handling system 450.

The assessed RSSI values in an embodiment for each of the wireless links established (e.g., 412, 414, 422, 424, 432, 434, 442, and 444) may be compared against wireless signal strength rating levels by the diverse wireless location determination system to determine which of the signals may be useful for multiangulation or multilateration processes in some embodiments. In other embodiments, the wireless signal strength ratings may also be used for applying weighting criteria to the received signals that depend on signal strength levels and the type of wireless signal (e.g., radiofrequency band or protocol type). This weighting correlation provides for a refined wireless location determination which may increase the reliability of the diverse wireless protocol multiangulation or multilateration processes according to embodiments herein.

Figure 5:
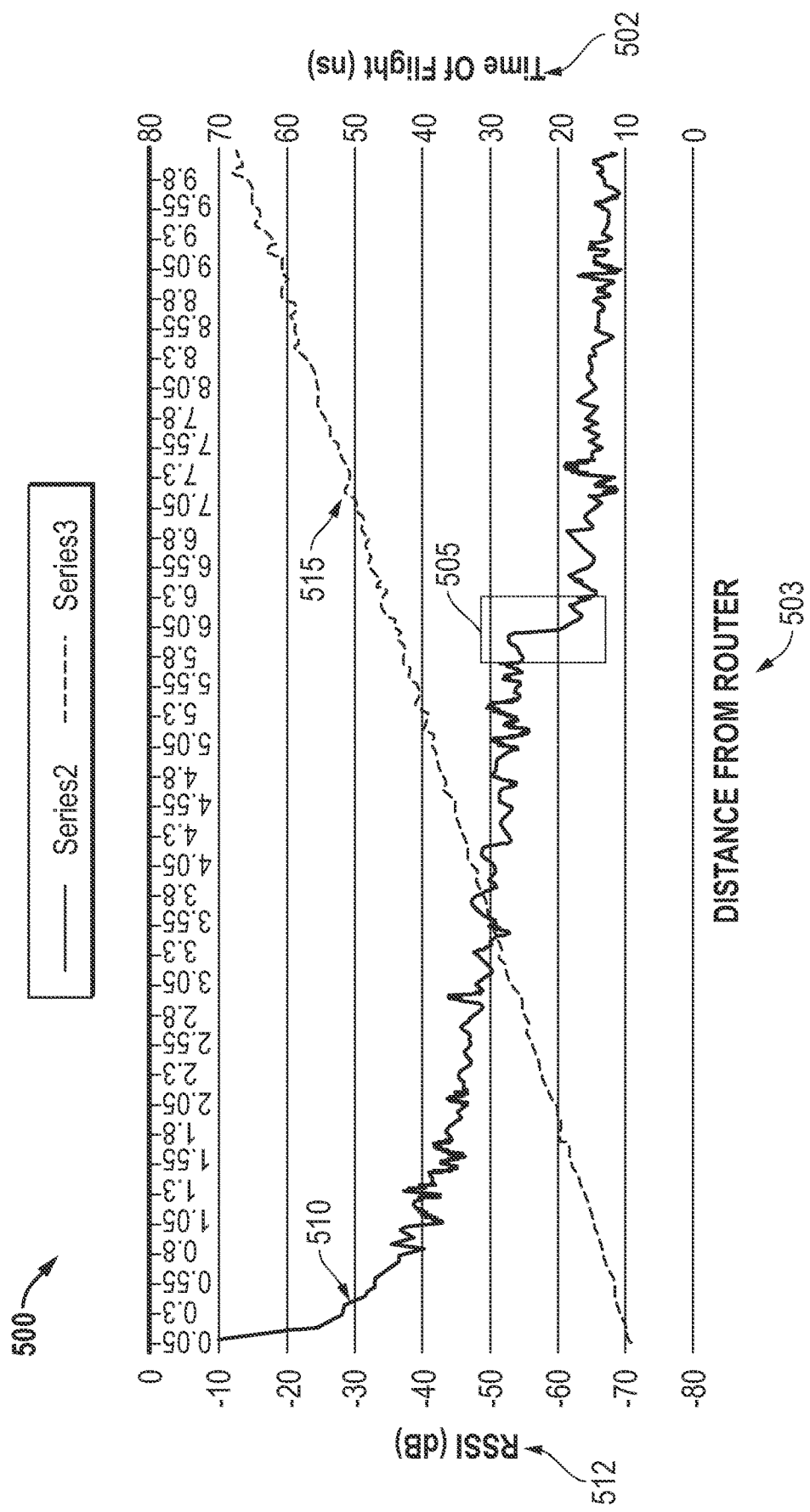
FIG. 5 is a graph diagram illustrating a relationship of distance from a wireless access point and signal strength drop off according to an embodiment of the present disclosure.

FIG. 5 is a graph 500 showing value of RSSI 510 versus a TOF 515 according to an embodiment of the present disclosure. The graph 500 shows a RSSI 510 representative of a signal sent or received by either of the access points or information handling systems over time. As FIG. 5 shows, the RSSI signal strength 512 (measured in decibels (dB)) degrades over time 502 and with distance 503 and this degradation may be predictable based on the distance of, for example, the information handling system from any one of the access points.

FIG. 5 also shows a TOF line 515 indicative of the time 502 a signal reaches its destination over a distance 503. By way of example, a signal from an access point may be sent to an information handling system along with a timestamp. The time stamp may be accurate enough to provide a TOF value on the order of nanoseconds (ns). Thus, in this example, the access point may provide not only a signal to the information handling system but also provide a timestamp the signal was sent so that the information handling system may compare the timestamp received from the access point with a timestamp the information handling system received the signal. Again, the accuracy of this comparison may be dependent on the precision of the network interface device of the information handling system but may be sufficient to determine the time 502 the signal took to traverse the distance 503 from the access point to the information handling system on the scale of nanoseconds. As can be seen, signal strength (RSSI) flattens out asymptotically as distance from the router increases so that at some point the signal degradation level is weak (e.g., below −60 dB) and may correlate to several distance within error margins. In the example embodiment shown, a similar RSSI level may be found between 7 meters and 10 meters.

FIG. 5 also shows a highlighted area 505 along the RSSI line 510. This specific highlighted area 505 shows a reduction in power (dB) of the RSSI value at a distance from the access point. In this example, this reduction is detected at 5.8 to 6.3 meters from the source of the signal (i.e., an access point). This reduction in power at 505, per FIG. 5, is around 52 to 65 dBm. As compared to the rest of the RSSI line 510, this reduction may indicate an object is present between the source of the signal (i.e., the access point) and the destination of the signal (i.e., the information handling system). Accordingly, data readings from signal strength RSSI levels may be altered or inaccurate due to intermediate objects.

Figure 6:
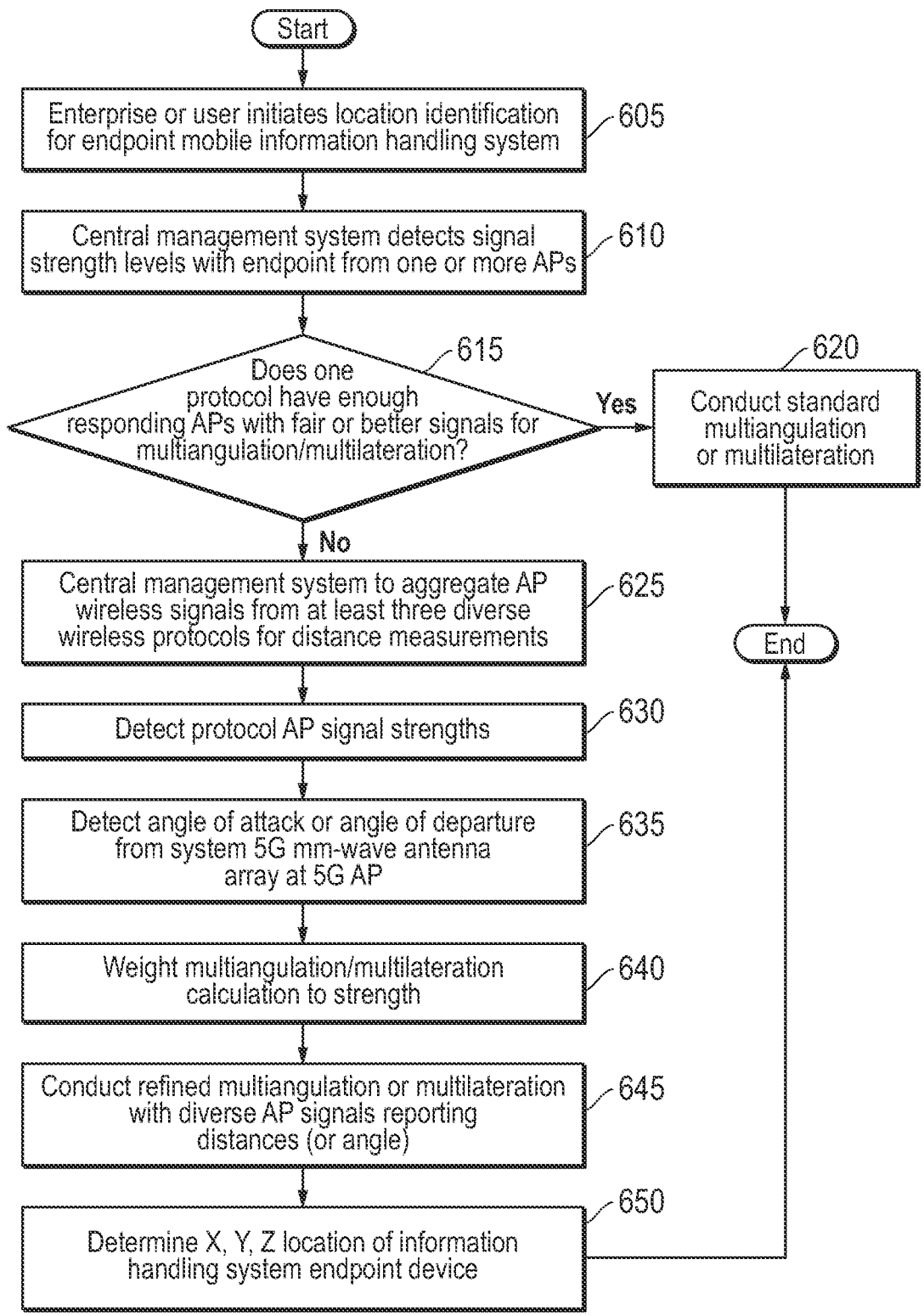
FIG. 6 is a flow diagram illustrating a method of conducting wireless location determination via a diversity of wireless network protocols according to an embodiment of the present disclosure.

FIG. 6 is a flow diagram illustrating a method of conducting wireless location determination via a diversity of wireless network protocols according to an embodiment of the present disclosure. As described herein, the diverse wireless signal based location determination system in an embodiment may aggregate signal distance related measurements, available angle related measurements, and signal strength levels from wireless links between an endpoint information handling system to be located and a plurality of diverse wireless protocol access points of known locations that may exchange signals with the endpoint information handling system. The diverse wireless location determination system may conduct a multiangulation or multilateration process on the received diverse wireless protocol distance or angle measurements to estimate a location of the endpoint wireless information handling system. In some embodiments, a refined multiangulation or multilateration process may be conducted with filtered results from the diverse wireless protocol distance or angle measurements. In further refinement, weighting adjustments may be applied to refine the multiangulation or multilateration process to adjust for variations in signal levels received or proficiency of the diverse wireless protocols in distance or angle determinations.

At block 605, an enterprise or a user may initiate a location determination for an endpoint mobile information handling system. The location determination may be required for utilization in an application or function operating on the endpoint mobile information handling system or may be pursuant to an application or system remotely operating and needing a location of the endpoint information handling system in some embodiments. For example, an enterprise management system may need to track the location of an endpoint information handling system. In other embodiments, the location assessment may be pursuant to a boot up process for the endpoint mobile information handling system location initiation. In an embodiment described in FIG. 6, some or all of the diverse wireless signal aggregation system or the diverse wireless location determination system may be executed on a central management system.

Proceeding to block 610, the endpoint information handling system may determine if one or more access point devices are in an area. Further, the system may prompt a communication signal exchange with one or more of the wireless access points in an area for determination of signal strength levels or signal quality levels, distance determination, and available relative angle measurements via wireless signal exchange. A plurality of signal strength levels or signal quality levels, distance determination, and available relative angle measurements determined pursuant to the wireless signals from the wireless nodes may be aggregated from one or more wireless network protocols in an embodiment. The diverse wireless signal aggregation system may operate on the endpoint information handling system in some embodiments to poll the various available wireless system types on the endpoint for the signal strength levels or signal quality levels, distance determination, and available relative angle measurements. These may be aggregated in a report including type of wireless signal and a MAC address or other identifier to identify the one or more wireless nodes that these measurements have been conducted with. In another embodiment, the diverse wireless signal aggregation system may operate on a remote information handling system and poll a plurality of access points in an area near the endpoint information handling system to conduct measurements in a signal exchange for signal strength levels or signal quality levels, distance determination, and available relative angle measurements and aggregate those results in a report with identifiers by MAC address or otherwise of the responding wireless access points in communication with the identified endpoint information handling system.

The method may proceed to block 615 where the system determines if any one protocol has enough wireless access points with responsive signal exchanges to conduct a multiangulation or multilateration location determination with one wireless protocol. A threshold signal level may be assessed to determine whether the signals from at least three of the same type of wireless protocol access point are sufficiently strong for a reliable wireless location determination via a standard multiangulation or multilateration approach. In an example embodiment, an agent of the system on the information handling system may assess whether there are at least three signals reported from the same type of wireless access point and whether those signals meet threshold levels of signal quality. This may occur before aggregation of diverse wireless signals is conducted in an example embodiment. In another embodiment, the diverse wireless location determination system, operating at the central management system, may receive aggregated signals from a variety of available types of wireless protocol access points and then assess for whether there are enough reporting access points of the same type and whether the reported signals from those access points meet at least a fair signal level. The agent may access a table to determine the level of signal that meets the fair signal level. An example assessment is shown in Table 1.

TABLE 1

| Signal Quality | Wi-Fi (dBm) | 3G (dBm) | 4G (dBm) | 5G mmWave (dBm) | BT 5.1 (dBm) |
|---|---|---|---|---|---|
| Excellent | −50 | −60 | −80 | −80 | −40 |
| Good | −50 to −60 | −50 to −70 | −80 to −90 | −80 to −95 | −50 to −60 |
| Fair | −60 to −70 | −70 to −80 | −90 to −100 | −95 to −105 | −60 to −70 |
| Poor | −80 to −80 | −80 to −90 | −100 to −110 | −105 to −110 | −70 to −80 |
| Bad | 80 | 90 | 110 | 110 | 80 |

It is understood that the values in Table 1 are example values and that any value ranges may be use as appropriated for the signal quality ratings in various embodiments. Upon determination that three or more detected wireless signals from different wireless access points are reporting signal exchanges at or above a threshold signal quality level of the same wireless protocol at block 615, the method may proceed to block 620. At block 620, the endpoint information handling system or the central management system may then conduct multiangulation or multilateration determination of location based on the wireless protocol reporting at least three responding access point signal exchanges. For example, if three or more Wi-Fi access points report signal exchanges, the method may conduct multilateration or multiangulation according to Wi-Fi® Round-trip-Time (Wi-Fi RTT) protocol methods. Similar single protocol multilateration or multiangulation algorithms may be conducted with varying degrees of accuracy for other wireless protocols. With such a single protocol determination of location of the endpoint information handling system, the location may be recorded or reported and the process may end.

Upon determination that three or more detected wireless signals must come from different wireless access points since not enough access points of a single protocol are available or the reported signal exchanges do not meet or exceed a threshold signal quality level, at block 615, the method may proceed to block 625. At block 625, the endpoint information handling system or the central management system may implement aggregation of diverse wireless signals from different wireless protocol networks via a diverse wireless signal aggregation system. The diverse wireless signal aggregation system may pull signal exchange data from all signal exchanges between the endpoint information handling system and the variety of wireless protocol access points in radiofrequency contact with the endpoint information handling system.

The diverse wireless signal aggregation system may generate a report identifying the endpoint information handling system, listing the variety of wireless protocol access points in radiofrequency contact with the endpoint information handling system, type of protocol associated with each responding wireless access point, signal strength levels associated with each type of signal exchange, and any distance or angle information determined from the wireless signal exchanges (e.g., TOF or signal degradation distance determinations or AoA or AoD phase shift determinations). Identification of each access point and the endpoint information handling system may be via MAC address in some embodiments. The known location or position of each type of wireless protocol access point exchanging signal with the endpoint information handling system may also be included in the diverse wireless aggregation report. The diverse wireless aggregation system may collect distance and signal strength data at the endpoint information handling system from the variety of wireless network interface modules operational there in some embodiments.

The diverse wireless aggregation system may access data the one or more wireless network interface devices or modules of a multiprotocol wireless interface device for the data to be included in the diverse wireless aggregation report. Controllers at each protocol type of wireless network interface device module may be capable of detecting signal strength measurements such as RSSI, SNR, or other metrics descriptive of the quality or power level of the exchanged wireless signal in the respective wireless protocol. Such controllers may also execute code instructions to determine distance or angle data for each exchanged signal for the wireless protocol managed by the wireless network interface device module. Similarly, such relevant exchanged signal data for diverse wireless aggregation report may be assessed and recorded at each of the responsive, diverse wireless protocol access points.

In embodiments where the diverse wireless aggregation system operates at a central management system or other remote information handling system from the endpoint information handling system, the diverse wireless aggregation system may access either the endpoint wireless information handling system or may access each of the plurality of wireless protocol types of access points within range of the endpoint information handling system. For example, during execution of the diverse wireless location determination system, an agent at the endpoint wireless information handling system may notify via any active wireless connection that it is online and seeking a wireless signal. The agent of the diverse wireless location determination system on the information handling system may gather identification of the plurality of diverse wireless protocol access points and send the list of responsive access points to diverse wireless aggregation system and the diverse wireless location determination system. With the identifiers, such as MAC addresses, of the diverse plurality of responsive access points, the diverse wireless aggregation system or the diverse wireless location determination system may link to those access points to collect the distance, angle, signal strength and other measurement details of any signal exchange with the endpoint wireless information handling system. In yet other embodiments, the agent at the endpoint information handling system may send a request to each of the responsive wireless access points to link to the diverse wireless aggregation system and diverse wireless location determination system for purposes of reporting data on signals exchanged with the endpoint wireless information handling system.

The diverse wireless aggregation report may be transmitted to the diverse wireless location determination system if separate or may be accessed by the diverse wireless location determination system in some embodiments at block 630. The diverse wireless location determination system may determine exchanged signal strength levels from the diverse wireless aggregation report for the variety of wireless protocol APs with which signals were exchanged. The diverse wireless location determination system may determine or have already determined signal rating classifications based on the above signal classifications shown in Table 1. Based on that classification, the diverse wireless location determination system may select at least three exchanged signals meeting at least a fair or better signal classification threshold depending on wireless protocol in some embodiments. In other embodiments, the diverse wireless location determination system may select all exchanged signals from any available wireless protocol as reported in the diverse wireless aggregation report that meet or exceed a fair signal level rating in an example embodiment. Other threshold selection determinations are contemplated and may depend on the number of available exchanged signals that have been returned in the diverse wireless aggregation report. For example, if three or more exchanged signals are returned as having a good or better rating, they may be selected for multiangulation or multilateration. If not, then any signals or additional exchanged signals above a fair rating may be included. In other embodiments, the top three, four, five or other available signals may be selected if meeting at least the fair signal level rating.

At block 635, the diverse wireless location determination system may determine from the aggregated wireless report that some data associated with reported exchanged signals includes angle data. In some embodiments, any type of communication protocol may conduct wireless signal transmission or reception with array antenna systems. For example, a mm-wave antenna array may be used with sub 6 GHz or greater than 6 GHz 5G NR type wireless communications. Such 5G mm-wave antenna arrays may be used for purposes of enabling beamsteering. Similarly, Bluetooth 5.1 proximity tracking protocol may utilize arrays of Bluetooth enabled antennas. In yet other embodiments, arrays of antennas may be deployed or utilized now or in the future with multiple available wireless protocols. These antenna arrays may include capability to detect phase shifts in transmitted or received signals by the antenna array and use that phase shift to determine angle of attack of a received transmission or angle of departure of a transmitted signal. The antenna array and at least one antenna on a reciprocal receiver or transmitter between the endpoint information handling system and access point pair may be utilized to determine such phase shift data. With this data, a relative angle may be determined between the endpoint information handling system and wireless access point pair for some reported wireless signal protocol types.

Relative angle data between an endpoint information handling system and wireless access point pair may be utilized by the diverse wireless location determination system in embodiments, along with known locations of the one or more reported access points to assist or increase accuracy of multiangulation or multilateration in embodiments herein. The diverse wireless location determination system may detect from the diverse wireless aggregation report any available angle information of endpoint device and access point pairs and may utilize such data when associated with an exchanged signal of sufficient wireless strength or quality. For example, angle data from a diverse wireless aggregation report may be utilized by the diverse wireless location determination system if associated with a reported signal with at least a fair signal strength classification.

Proceeding to block 640, in some embodiments, the reliability among reporting wireless protocol signal types for distance or angle data may vary. Moreover, the reported signals in the diverse wireless signal aggregation report may also vary in terms of strength reported, thus further adding variation to reliability of the reported distance or angle data. In embodiments herein, to leverage the potential of several reported signal measurements from a wider variety of wireless signal protocols, the diverse wireless location determination system may weight the signals to generate a weighted average from among the plurality of reported signals before conducting multiangulation or multilateration determination of location.

In an embodiment, the diverse wireless location determination system may access a weighting table to assign weighting values that correlate to signal strengths and also account for variations in efficacy of wireless protocols and their communication bandwidths in providing accurate distance (or angle) measurements. An example weighting table is shown in Table 2.

TABLE 2

| Signal Quality | Wi-Fi (dBm) | 3 G (dBm) | 4 G (dBm) | 5 G mmwave (dBm) | BT 5.1 | Weighting factor (%) |
|---|---|---|---|---|---|---|
| Excellent | >−50 | >−60 | >−80 | >−80 | >−40 | 40 |
| Good | −50 to −60 | −50 to −70 | −80 to −90 | −80 to −95 | −50 to −60 | 20 |
| Fair | −60 to −70 | −70 to −80 | −90 to −100 | −95 to −105 | −60 to −70 | 10 |
| Poor | −80 to −80 | −80 to −90 | −100 to −110 | −105 to −110 | −70 to −80 | 5 |
| Bad | <−80 | <−90 | <−110 | <−110 | <−80 | 1 |

It is understood that the values in Table 2 are example values and that any value ranges may be use as appropriated for the signal quality ratings in various embodiments. While it is shown that a single array of weighting factors is associated with wireless signal quality rating categories, it is understood that the weighting factors may be specifically tailored further the each reported wireless signal protocol type. It is noted that the signal quality rating categories vary in dBm range levels to account for differing efficacy of distance measurements or angle measurements. It is contemplated further that weighting factor values may be specifically tailored to each reported signal wireless protocols. For example, a custom set of weighting factors is contemplated for each wireless protocol such that a value of 40 may only apply to Wi-Fi "excellent" signals while a value of 45 may apply to "excellent" 5G NR signals, and a value of 35 may apply to 3G LTE "excellent" signals and so forth.

The method may proceed to block 645 to conduct a refined multilateration or multiangulation location determination based on the selected diverse wireless signal values for distance or angle chosen according to the above embodiments. At block 645, a weighted calculation of X, Y location values or X, Y, Z location values may use multilateration or multiangulation location determination and apply a weighting system to refine the calculations for improved accuracy despite the variations due to different signal quality levels or different types of wireless protocols. The diverse wireless location determination system may apply determine based on reported signal strength and wireless signal protocol type, which weighting factor to apply. The determination of position may thus be determined relative to known locations of reporting access points of a diversity of wireless signal protocols in communication with a target endpoint information handling system. An example weighting refinement is shown as follows. For the following weighting system, XN is an x coordinate location determined by an Nth reported wireless signal, YN is a y coordinate location determined by an Nth reported wireless signal, ZN is a z coordinate location (where relevant for 3D location determination) determined by an Nth reported wireless signal, and N represent 1 to N reported wireless signals that may come from exchanges with diverse types, or in some cases some two overlapping types, of wireless protocol access points. Weighting factor WN is a weighting factor applied according to Table 2 based on signal quality rating of reported signals. Accordingly, the weighting determination may be made as follows in some example embodiments:

$$X = (X1*W1) + (X2*W2) + (X3*W3) + \ldots (XN*WN)/100*N;$$

$$X = (Y1*W1) + (Y2*W2) + (Y3*W3) + \ldots (YN*WN)/100*N; \text{ and}$$

$$X = (Z1*W1) + (Z2*W2) + (Z3*W3) + \ldots (ZN*WN)/100*N.$$

At block 650, pursuant to the above weighting assignments, the diverse wireless location determination system may determine the refined location of an endpoint information handling system relative to three or more known locations of diverse wireless signal protocol access points within range. The diverse wireless location determination system may store the refined wireless location determination in memory. Further, the central management systems executing the diverse wireless location determination system may report the refined wireless location determination to the endpoint information handling system or broader applications requiring an accurate location. In such aspects, the diverse wireless location determination system may provide for refined accuracy in wireless tracking endpoint information handling system locations in settings where only a diversity of wireless access points are available.

The mobile information handling system in an embodiment may operate any portion of the diverse wireless location determination system as described in connection with a central management system. Reporting and storage may be transmitted or broadcast according to any of the responding wireless protocols within range of the endpoint wireless information handling system or other network connections in various embodiments. At this point, the method may end until another wireless location determination is needed.

Figure 7:
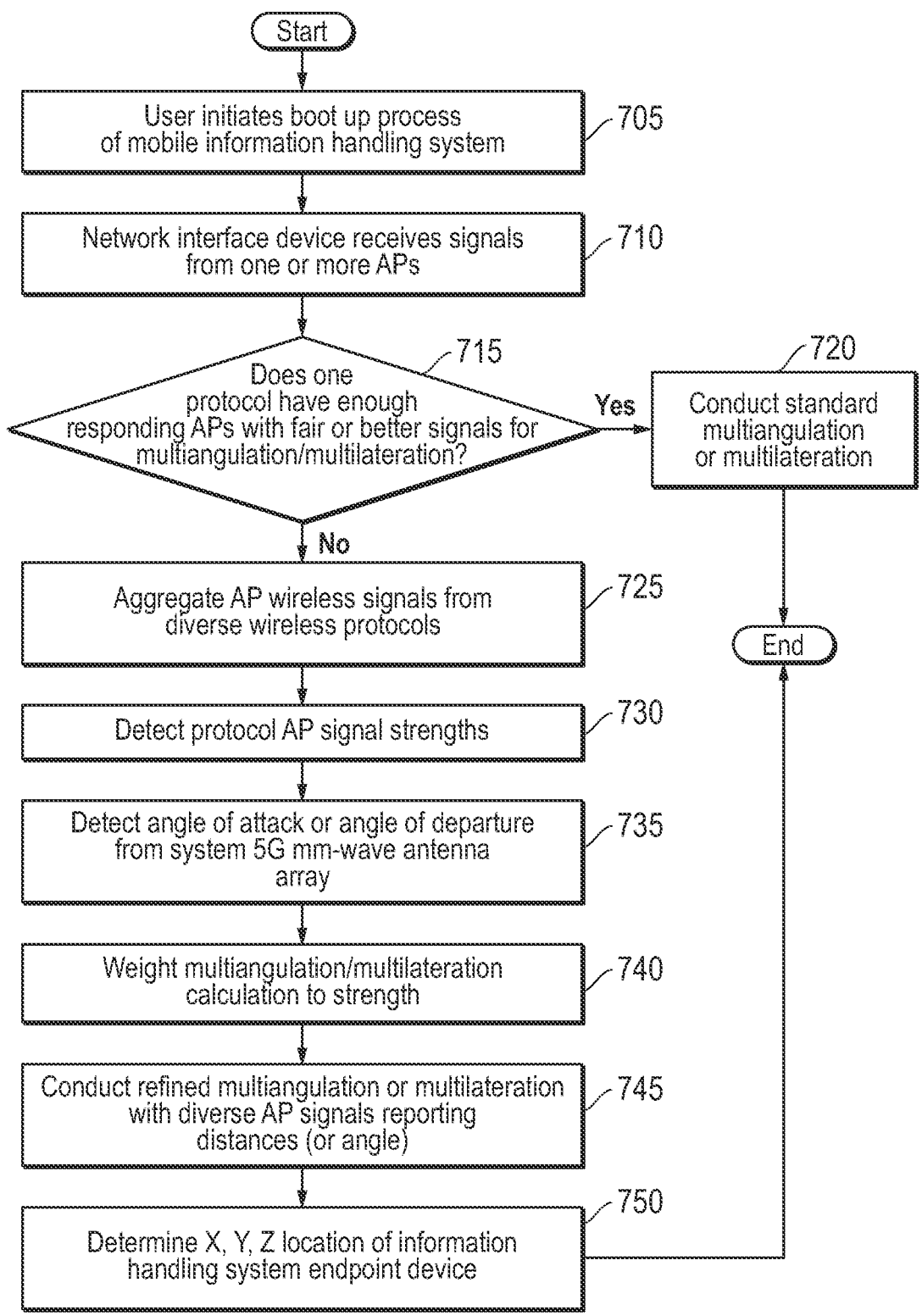
FIG. 7 is a flow diagram illustrating a method of conducting wireless location determination via a diversity of wireless network protocols according to another embodiment of the present disclosure.

FIG. 7 is a flow diagram illustrating a method of conducting wireless location determination via a diversity of wireless network protocols according to another embodiment of the present disclosure. As described herein, the diverse wireless signal based location determination system in an embodiment may aggregate signal distance related measurements, available angle related measurements, and signal strength levels from wireless links between an endpoint information handling system to be located and a plurality of diverse wireless protocol access points of known locations that may exchange signals with the endpoint information handling system. The diverse wireless location determination system may conduct a multiangulation or multilateration process on the received diverse wireless protocol distance or angle measurements to estimate a location of the endpoint wireless information handling system. In some embodiments, a refined multiangulation or multilateration process may be conducted with filtered results from the diverse wireless protocol distance or angle measurements. In further refinement, weighting adjustments may be applied to refine the multiangulation or multilateration process to adjust for variations in signal levels received or proficiency of the diverse wireless protocols in distance or angle determinations.

At block 705, the diverse wireless location determination system may operate during the boot up process, during set up and access to one or more wireless networks. The boot up process may be initiated for the endpoint information handling system. The mobile information handling system may operate a portion of the diverse wireless location determination system in an embodiment via firmware, software or within the Basic Input Output (BIOS) of the mobile information handling system.

At block 710, the network interface device of the endpoint information handling system in an embodiment may receive wireless signals from one or more in-range access points from a diversity of potential wireless network protocols. The diversity of wireless network protocols may be supported by wireless network interface modules operational on the endpoint information handling system. For example, the endpoint information handling system in an embodiment may send or receive a broadcast message with one or more access points across a plurality of protocol types for the wireless network interface modules. These broadcast messages may be part of an exchange between the mobile information handling system and the access point of a series of Extensible Authentication Protocol (EAP) messages with the access point as part of a Wi-Fi Protected Setup (WPS) security method.

RSSI values and time of flight (TOF) for communications between the mobile information handling system and several access points may be determined via these exchanged signals according to several embodiments described herein. For example, the time of flight for the transmission of the EAP message from the mobile information handling system to a plurality of different access points, and the access points responsive message granting preliminary access may be determined by analyzing header and footer information of the message packets, or timestamps associated with such messages. The time of flight (TOF) in an embodiment may identify the time that elapses between transmission of a wireless communication from the mobile information handling system to an access point, or vice-versa. For example, a first TOF in an embodiment described with reference to FIG. 5 may identify a first time that elapses between transmission of communication from an endpoint information handling system to an access point. In such an embodiment, other TOF metrics may be measured to identify a plurality of elapsed time measurements between transmission of communication from the endpoint information handling system a plurality of diverse access points. Comparison of these TOF measurements may be used to indicate distances of the endpoint information handling system relative to each of the plurality of diverse access points with known position coordinates.

The various protocol network interface device modules operating via controllers at the endpoint information handling system may also measure RSSI or other signal quality measurement values for the wireless links established between the mobile information handling system and the one or more diverse endpoints in an embodiment. For example, in an embodiment described with reference to FIG. 1, the diverse wireless location determination system 136 may measure or collect measurements of a power present in a received wireless signal such as a signal received by the information handling system 100 from a plurality of access points 138-1, 138-2, 138-N. The diverse wireless location determination system 136 may be in the form of an application specific integrated circuit (ASIC) that receives signal strength data (e.g., RSSI values) from the network interface device 120 or may operate a software and collect the same measurements from controller operating at the plurality of network interface devices modules. The diverse wireless location determination system 136 may compare the RSSI data to the time of flight (TOF) data to detect a reduction in power of the signal strength (resulting from the signal passing through a structure) relative to the time the signal took to be received by either or both of the information handling system 100 or network interface device 120. The reduction in RSSI relative to the TOF data may variations or issues in signal conditions such as interference levels, or a barrier or object such as a wall is present between any of the access points 138-1, 138-2, 138-N and the endpoint information handling system 100 within the network operating the systems and methods described herein.

Thus, the endpoint information handling system may determine if one or more access point devices are in an area. Further, the system may prompt a communication signal exchange with one or more of the wireless access points in an area for determination of signal strength levels or signal quality levels, distance determination, and available relative angle measurements via wireless signal exchange. A plurality of signal strength levels or signal quality levels, distance determination, and available relative angle measurements are determined pursuant to the exchanged wireless signals from the wireless interface device modules.

The method may proceed to block 715 where the system determines if any one protocol has enough wireless access points with responsive signal exchanges to conduct a multiangulation or multilateration location determination with one wireless protocol. As described above, a threshold signal level may be assessed to determine whether the signals from at least three of the same type of wireless protocol access point are sufficiently strong for a reliable wireless location determination via a standard multiangulation or multilateration approach. In an example embodiment, the endpoint information handling system may assess whether there are at least three signals reported from the same type of wireless access point and whether those signals meet threshold levels of signal quality. The diverse wireless location determination system may access a table, such as Table 1 above to determine the signal quality levels that correspond to a threshold level of usability of the three or more signal received of a same wireless protocol. For example, the diverse wireless location determination system may refer to Table 1 to determine that the three signals are at least at the threshold "fair" signal level for a particular protocol.

Upon determination that three or more detected wireless signals from different wireless access points operating under the same wireless protocol are reporting signal exchanges at or above a threshold signal quality level of the same wireless protocol at block 715, the method may proceed to block 720. At block 720, the endpoint information handling system may then conduct multiangulation or multilateration determination of location based on the wireless protocol reporting at least three responding access point signal exchanges. For example, if three or more Wi-Fi access points report signal exchanges, the method may conduct multilateration or multiangulation according to Wi-Fi® Round-trip-Time (Wi-Fi RTT) protocol methods. Similar single protocol multilateration or multiangulation algorithms may be conducted with varying degrees of accuracy for other wireless protocols. With such a single protocol determination of location of the endpoint information handling system, the location may be recorded or reported and the process may end.

Upon determination that three or more detected wireless signals must come from different wireless access points at 715, then flow may proceed to block 725. There are several scenarios under which not enough access points respond from the same type of wireless protocol. In indoor spaces, there may be limited numbers of access points deployed from a single protocol and not enough are available. In another aspect, three or more access points may be in a location determination area, but the reported signal exchanges do not meet or exceed a threshold signal quality level at block 715 to exceed the reliable levels of wireless signals available from other wireless protocol access points.

At block 725, the endpoint information handling system may aggregate diverse wireless signals from different wireless protocol networks via a diverse wireless signal aggregation system. The diverse wireless signal aggregation system may pull signal exchange data from all signal exchanges received or sent from the wireless network device modules operational on the information handling system. The diverse wireless signal aggregation system operates on the endpoint information handling system in some embodiments to poll the various controller of available wireless protocol types on the endpoint for the signal strength levels, other signal quality levels, distance determination, and any available relative angle measurements. These may be aggregated in a report including type of wireless signal and a MAC address or other identifier to identify the one or more wireless access point nodes that the signals have been exchanged with and the measurements drawn from.

The diverse wireless signal aggregation system may generate a report identifying the endpoint information handling system, listing the variety of wireless protocol access points in radiofrequency contact with the endpoint information handling system, type of protocol associated with each responding wireless access point, signal strength levels associated with each type of signal exchange, and any distance or angle information determined from the wireless signal exchanges (e.g., TOF or signal degradation distance determinations or AoA or AoD phase shift determinations). Identification of each access point and the endpoint information handling system may be via MAC address in some embodiments. The known location or position of each type of wireless protocol access point exchanging signal with the endpoint information handling system may also be included in the diverse wireless aggregation report.

The diverse wireless aggregation system may collect distance and signal strength data at from the variety of wireless network interface modules operational on the endpoint information handling system in some embodiments. In other embodiments, one or more wireless network interface devices or modules of a multiprotocol wireless interface device for the data determination may operate in the endpoint information handling system. The diverse wireless aggregation system may collect distance and signal strength data at the multiprotocol wireless interface device for data to be included in the diverse wireless aggregation report. Controllers at each protocol type of wireless network interface device module may be capable of detecting signal strength measurements such as RSSI, SNR, or other metrics descriptive of the quality or power level of the exchanged wireless signal in the respective wireless protocol. Such controllers may also execute code instructions to determine distance or angle data for each exchanged signal for the wireless protocol managed by the wireless network interface device module. Similarly, such relevant exchanged signal data for diverse wireless aggregation report may be assessed and recorded at each of the responsive, diverse wireless protocol access points.

The diverse wireless location determination system may access the diverse wireless aggregation report in some embodiments at block 730. The diverse wireless location determination system may determine exchanged signal strength levels from the diverse wireless aggregation report for the variety of wireless protocol APs with which signals were exchanged. The diverse wireless location determination system may determine or have already determined signal rating classifications based on the above signal classifications shown in Table 1. Based on that classification, the diverse wireless location determination system may select at least three exchanged signals meeting at least a fair or better signal classification threshold depending on wireless protocol in some embodiments. In other embodiments, the diverse wireless location determination system may select all exchanged signals from any available wireless protocol as reported in the diverse wireless aggregation report that meet or exceed a fair signal level rating or another minimum signal threshold rating level in example embodiments. Other threshold selection determinations are contemplated and may depend on the number of available exchanged signals that have been returned in the diverse wireless aggregation report. For example, if three or more exchanged signals are returned as having a good or better rating, they may be selected for multiangulation or multilateration. If not, then any signals or additional exchanged signals above a fair rating may be included. In other embodiments, the top three, four, five or other available signals may be selected if meeting at least the fair signal level rating.

At block 735, the diverse wireless location determination system may determine from the aggregated wireless report that some data associated with reported exchanged signals includes angle data. In some embodiments, any type of communication protocol may conduct wireless signal transmission or reception with array antenna systems. For example, a mm-wave antenna array may be used with sub 6 GHz or greater than 6 GHz 5G NR type wireless communications. In other embodiments, arrays of antennas may be deployed or utilized now or in the future with multiple available wireless protocols operational at the endpoint information handling system or operational at deployed access points. These antenna arrays may include capability to detect phase shifts in transmitted or received signals by the antenna array and use that phase shift to determine angle of attack of a received transmission or angle of departure of a transmitted signal. The antenna array and at least one antenna on a reciprocal receiver or transmitter between the endpoint information handling system and access point pair may be utilized to determine such phase shift data. With this data, a relative angle may be determined between the endpoint information handling system and wireless access point pair for some reported wireless signal protocol types.

Relative angle data between an endpoint information handling system and wireless access point pair may be utilized by the diverse wireless location determination system in embodiments, along with known locations of the one or more reported access points to assist or increase accuracy of multiangulation or multilateration in embodiments herein. The diverse wireless location determination system may detect from the diverse wireless aggregation report any available angle information of endpoint device and access point pairs and may utilize such data when associated with an exchanged signal of sufficient wireless strength or quality. For example, angle data from a diverse wireless aggregation report may be utilized by the diverse wireless location determination system if associated with a reported signal with at least a fair signal strength classification.

Proceeding to block 740, in some embodiments, the reliability among reporting wireless protocol signal types for distance or angle data may vary. Moreover, the reported signals in the diverse wireless signal aggregation report may also vary in terms of strength reported, thus further adding variation to reliability of the reported distance or angle data. In embodiments herein, to leverage the potential of several reported signal measurements from a wider variety of wireless signal protocols, the diverse wireless location determination system may weight the signals to generate a weighted average from among the plurality of reported signals before conducting multiangulation or multilateration determination of location.

In an embodiment, the diverse wireless location determination system may access a weighting table at block 740 to determine appropriate weighting values that correlate to signal strengths and also account for variations in efficacy of wireless protocols in providing accurate distance (or angle) measurements. An example weighting table is shown above in Table 2.

While it is shown that a single array of weighting factors is associated with wireless signal quality rating categories, it is understood that the weighting factors may be specifically tailored for each reported wireless signal protocol type to account for values or potential accuracy of distance determinations under those protocols and at those operating frequencies. For example, high frequency signals may be very accurate a short distances but much less accurate at further distances. In other aspects, low frequency signals may still be useful at further distances but not as accurate at close distances as high frequency signals. For example, a custom set of weighting factors is contemplated for each wireless protocol such that a value of 40 may only apply to Wi-Fi "excellent" signals while a value of 45 may apply to "excellent" 5G NR signals, and a value of 35 may apply to 3G LTE "excellent" signals and so forth.

The method may proceed to block 745 to conduct a refined multilateration or multiangulation location determination based on the selected diverse wireless signal values for distance or angle chosen according to the above embodiments. At block 745, a weighted calculation of X, Y two dimensional location values or X, Y, Z three dimensional location values may use multilateration or multiangulation location determination and apply a weighting system to refine the calculations for improved accuracy despite the variations due to different signal quality levels or different types of wireless protocols. The diverse wireless location determination system may apply determine based on reported signal strength and wireless signal protocol type, which weighting factor to apply. The determination of position may thus be determined relative to known locations of reporting access points of a diversity of wireless signal protocols in communication with a target endpoint information handling system.

An example weighting refinement is shown as follows and similar to that described above. For the following weighting system, XN is an x coordinate location determined by an Nth reported wireless signal, YN is a y coordinate location determined by an Nth reported wireless signal, ZN is a z coordinate location (where relevant for 3D location determination) determined by an Nth reported wireless signal, and N represent 1 to N reported wireless signals that may come from exchanges with diverse types, or in some cases some two overlapping types, of wireless protocol access points. Weighting factor WN is a weighting factor applied according to Table 2 based on signal quality rating of reported signals. Accordingly, the weighting determination may be made as follows in some example embodiments:

$$X = (X1*W1) + (X2*W2) + (X3*W3) + \ldots (XN*WN)/100*N;$$

$$X = (Y1*W1) + (Y2*W2) + (Y3*W3) + \ldots (YN*WN)/100*N; \text{ and}$$

$$X = (Z1*W1) + (Z2*W2) + (Z3*W3) + \ldots (ZN*WN)/100*N.$$

At block 750, pursuant to the above weighting assignments, the diverse wireless location determination system may determine the refined location of an endpoint information handling system relative to three or more known locations of diverse wireless signal protocol access points within range. The diverse wireless location determination system may store the refined wireless location determination in memory. Further, the central management systems executing the diverse wireless location determination system may report the refined wireless location determination to the endpoint information handling system or broader applications requiring an accurate location. In such aspects, the diverse wireless location determination system may provide for refined accuracy in wireless tracking endpoint information handling system locations in settings where only a diversity of wireless access points are available.

The mobile information handling system in an embodiment may operate any portion of the diverse wireless location determination system as described in connection with a central management system in variations on the embodiment of FIG. 7. Reporting and storage may be transmitted or broadcast according to any of the responding wireless protocols within range of the endpoint wireless information handling system or other network connections in various embodiments. At this point, the method may end until another wireless location determination is needed.

The blocks of the flow diagrams of FIG. 6-7 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer implemented method of executing a diverse wireless location determination system to locate an endpoint information handling system, comprising:
receiving an instruction to determine a location of an endpoint information handling system having one or more network interface device modules supporting a plurality of wireless network protocols;
determining, via a processor executing code instructions of a central management system, that exchanged signals with at least three diverse wireless protocol access points with a known location meet a signal quality threshold, where at least two of the diverse wireless protocol access points operate under different wireless network protocols;
aggregating data including detected time of flight (TOF) signal distance and signal quality values relating to signals exchanged between the endpoint information handling system and the at least three diverse wireless protocol access points;
weighting coordinate location distance values based on received signal quality values for each of the exchanged signals with the at least three diverse wireless protocol access points, wherein weighting values applied to the coordinate location distance values depends on a type of wireless protocol of the exchanged signal; and
determining location of the endpoint information handling system relative to the at least three diverse wireless protocol access points via multiangulation or multilateration with the weighted aggregated data.

2. The method of claim 1 wherein the at least two diverse wireless protocol access points operate under the different wireless protocols including at least one Wi-Fi wireless protocol and at least one 3GPP or 3GPP2 wireless protocol.

3. The method of claim 1 further comprising:
determining an angle between at least one diverse wireless protocol access point via wireless protocol implementing an antenna array at either the endpoint information handling system or the at least one diverse wireless access point for angle of attack or angle of departure angle determination; and
accessing data relating to the angle to conduct multiangulation or multilateration.

4. The method of claim 1 further comprising:
transmitting the determined location of the endpoint information handling system to authorized applications to utilize the location for tracking the endpoint information handling system.

5. The method of claim 1, wherein the least three diverse wireless protocol access points include a 5G NR access point and a Wi-Fi access point.

6. The method of claim 1 further comprising:
selecting the at least three diverse wireless protocol access points whose TOF signal distance data is used for multiangulation or multilateration of the location of the endpoint information handling system have a highest signal quality of exchanged signals from a plurality of available diverse wireless protocol access points within range of the endpoint information handling system.

7. The method of claim 1 wherein higher rated signal quality category received for exchanged signals have a greater weighting factor value applied to the coordinate location distance values for that exchanged signal data for TOF signal distance than a lower weighting factor applied for lower rated signal quality categories received for exchanged signals.

8. An information handling system operating a diverse wireless location determination system central manager, comprising:
a network interface receiving an instruction to determine a location of an endpoint information handling system having a plurality of network interface device modules supporting a plurality of wireless network protocols;
a processor executing instructions of a diverse wireless signal aggregation system to aggregate data relating to signals exchanged between the endpoint information handling system and a plurality of diverse wireless protocol access points at identified locations, where at least two of the diverse wireless protocol access points operate under different wireless network protocols;
a processor executing instructions of the diverse wireless location determination system central manager to receive a detected time of flight (TOF) signal distance between the endpoint information handling system and each of the plurality of diverse wireless protocol access points including one or more received signal quality values for the exchanged signals with weighted TOF signal distances weighted based on detected signal quality category and type of wireless protocol for the exchanged signal;
the processor determining that exchanged signals with at least three diverse wireless protocol access points meet a signal quality threshold; and
the processor conducting multiangulation or multilateration utilizing the detected TOF signal distances of the exchanged signals with the plural diverse wireless protocol access points having identified locations to determine the location of the endpoint information handling system.

9. The information handling system of claim 8 further comprising:
a first network interface device supporting a Wi-Fi wireless network protocol; and
a second network interface device supporting a 3GPP or 3GPP2 wireless network protocol.

10. The information handling system of claim 8 further comprising:
at least one network interface device module communicates via an array of antennas for at least one wireless protocol; and
the diverse wireless location determination system central manager to receive an angle determination for the wireless protocol involving the array of antennas, where the angle determination is used in the multiangulation or multilateration for determining to determine the location of the endpoint information handling system.

11. The information handling system of claim 8 wherein the one or more received signal quality factors include a received signal strength indication (RSSI) for each of the exchanged signals with the plurality of diverse protocol access points.

12. The information handling system of claim 8 further comprising:
diverse wireless location determination system central manager to transmit the determined location of the endpoint information handling system to authorized applications to utilize the location for tracking the endpoint information handling system.

13. The information handling system of claim 8 further comprising:
the data of exchanged signals is received from network interface device modules including a 5G NR wireless network interface device module and a Wi-Fi wireless network interface device module available at the endpoint information handling system being wirelessly located.

14. The information handling system of claim 8 further comprising:
the diverse wireless location determination system central manager determines that at least three exchanged signals from the plural diverse wireless protocol access points meet the signal quality threshold and selects TOF distance measurements from those exchanged signals to conduct multiangulation or multilateration.

15. The information handling system of claim 8 wherein exchanged signals with the plural diverse wireless protocol access points meeting the signal quality threshold include at least one Wi-Fi access point and one gNodeB access point.

16. An information handling system operating a diverse wireless location determination system, comprising:
a network interface receiving an instruction to determine a location of an endpoint information handling system having a plurality of network interface device modules supporting a plurality of wireless network protocols;
a processor executing instructions of a diverse wireless signal aggregation system to aggregate data including detected time of flight (TOF) signal distance and signal quality values relating to signals exchanged between the endpoint information handling system and a plurality of diverse wireless protocol access points, where at least two of the diverse wireless protocol access points operate under different wireless protocols; and
the processor conducting weighted multiangulation or multilateration utilizing the detected TOF signal distance values of the exchanged signals with the plurality of diverse wireless protocol access points to determine the location of the endpoint information handling system, wherein a weighting factor applied to the detected TOF signals depends on the detected signal quality values and a type of wireless protocol for the exchanged signals.

17. The information handling system of claim 16 wherein the diverse wireless protocol access points operate under the different wireless protocols including at least one Wi-Fi wireless protocol and at least one 3GPP or 3GPP2 wireless protocol.

18. The information handling system of claim 16 further comprising: at least one network interface device module communicates via an array of antennas for at least one wireless protocol;
the processor receives an angle determination for the wireless protocol involving the array of antennas; and
the processor conducts the weighted multiangulation or multilateration utilizing the detected TOF signal distance values further with the angle determination.

19. The information handling system of claim 16 further comprising: the exchanged signal data including detected TOF signal distance and signal quality values is aggregated from network interface device modules including a 5G NR wireless network interface device module, a Wi-Fi wireless network interface device module, and an LTE wireless network interface module available at the endpoint information handling system being wirelessly located.

20. The information handling system of claim 16 further comprising: the diverse wireless location determination system determines that at least three exchanged signals from the same wireless protocol type meet the signal quality threshold and selects TOF distance measurements from those exchanged signals to conduct multiangulation or multilateration.

* * * * *